US012732805B2

(12) United States Patent
Joh et al.

(10) Patent No.: US 12,732,805 B2
(45) Date of Patent: Sep. 8, 2026

(54) INTEGRATED TERMINAL DEVICE AND CONTROL METHOD OF INTEGRATED TERMINAL DEVICE

(71) Applicant: KT CORPORATION, Gyeonggi-do (KR)

(72) Inventors: Han Jin Joh, Gyeonggi-do (KR); Woo Jin Nam, Gyeonggi-do (KR); Ji Hyuk Chung, Gyeonggi-do (KR); Chang Pyo Hong, Gyeonggi-do (KR); Yoo Seung Won, Gyeonggi-do (KR); Hyun Gi Choi, Gyeonggi-do (KR); Min Sub Kim, Gyeonggi-do (KR); Jae Wook Lee, Gyeonggi-do (KR); Min Seo Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 109 days.

(21) Appl. No.: 18/860,651

(22) PCT Filed: Apr. 26, 2023

(86) PCT No.: PCT/KR2023/005684

§ 371 (c)(1),
(2) Date: Dec. 11, 2024

(87) PCT Pub. No.: WO2023/211149

PCT Pub. Date: Nov. 2, 2023

(65) Prior Publication Data

US 2025/0301313 A1 Sep. 25, 2025

(30) Foreign Application Priority Data

Apr. 26, 2022 (KR) ........................ 10-2022-0051507
Apr. 26, 2022 (KR) ........................ 10-2022-0051508

(Continued)

(51) Int. Cl.
*H04L 29/12* (2006.01)
*H04L 12/66* (2006.01)
(Continued)

(52) U.S. Cl.
CPC ........... *H04W 12/04* (2013.01); *H04L 61/103* (2013.01); *H04L 61/5014* (2022.05); *H04W 84/12* (2013.01)

(58) Field of Classification Search
CPC .... H04W 12/04; H04W 84/12; H04L 61/103; H04L 61/5014; H04L 2101/622;
(Continued)

(56) References Cited

U.S. PATENT DOCUMENTS

| | | | | |
|---|---|---|---|---|
| 2005/0068969 A1* | 3/2005 | Park | H04L 61/00 370/352 |
| 2006/0072622 A1* | 4/2006 | Cho | H04H 20/82 370/486 |

(Continued)

FOREIGN PATENT DOCUMENTS

| | | | |
|---|---|---|---|
| EP | 3091715 A1 * | 11/2016 | H04L 61/5014 |
| KR | 10-2005-0010284 A | 1/2005 | |

(Continued)

OTHER PUBLICATIONS

Chengchen Ge, Ying Li, Xiaoli Zhi, Weiqin Tong; "The Intelligent STB-Implementation of Next Generation of Residential Gateway in Digital Home"; 2007 2nd International Conference on Pervasive Computing and Applications; Conference Paper; Publisher: IEE; Mar. 2007; pp. 1-6 (Year: 2007).*

(Continued)

*Primary Examiner* — Fatoumata Traore
*Assistant Examiner* — Courtney D Fields
(74) *Attorney, Agent, or Firm* — IP Legal Services, LLC

(57) ABSTRACT

An integrated terminal device according to an embodiment of the present invention comprises: an access point (AP) unit (Continued)

that provides a wireless LAN function; and a set-top box (STB) unit connected to the AP unit through Ethernet, wherein the AP unit may initiate home network communication with the STB unit through a dynamic host configuration protocol (DHCP) and allocate an internet protocol (IP) address to the STB unit, and the AP unit and the STB unit may transmit and receive packets to and from each other through inter process communication (IPC).

20 Claims, 33 Drawing Sheets

(30) Foreign Application Priority Data

Apr. 26, 2022 (KR) ........................ 10-2022-0051515
Apr. 26, 2023 (KR) ........................ 10-2023-0054396
Apr. 26, 2023 (KR) ........................ 10-2023-0054397
Apr. 26, 2023 (KR) ........................ 10-2023-0054398

(51) Int. Cl.
*H04L 61/103* (2022.01)
*H04L 61/5014* (2022.01)
*H04W 12/04* (2021.01)
*H04H 20/82* (2008.01)
*H04W 84/12* (2009.01)

(58) Field of Classification Search
CPC ....... H04L 9/06; H04L 12/28; H04L 61/2514; H04L 61/2517; H04L 67/00; H04N 21/436; H04N 21/4363; H04R 1/02
See application file for complete search history.

(56) References Cited

U.S. PATENT DOCUMENTS

2011/0281543 A1* 11/2011 White ................. H04L 12/2838 455/337
2013/0262637 A1 10/2013 Weaver et al.
2015/0237398 A1* 8/2015 Wang ................. H04N 21/6125 725/110
2016/0330165 A1 11/2016 Jeanne et al.

FOREIGN PATENT DOCUMENTS

KR 10-2005-0030706 A 3/2005
KR 10-2005-0035200 A 4/2005
KR 10-2007-0014719 A 2/2007
KR 10-2008-0016250 A 2/2008
KR 10-2009-0041155 A 4/2009
KR 10-2009-0105718 A 10/2009
KR 10-2013-0141599 A 12/2013
KR 10-1668852 B1 10/2016
KR 10-2017-0083240 A 7/2017
KR 10-2019-0100096 A 8/2019
KR 10-2019-0123680 A 11/2019
KR 10-2020-0080635 A 7/2020
WO WO-2014180415 A1 * 11/2014 ....... H04N 21/64707

OTHER PUBLICATIONS

Korean Intellectual Property Office, International Search Report of International Application No. PCT/KR2023/005684, Jul. 26, 2023.

* cited by examiner

FIG. 5

| CLASSIFICATION /DESCRIPTION | Parameters | Size (Bytes) | Type | DESCRIPTION |
|---|---|---|---|---|
| Header | Name | 8 | Char | "S-Box" |
| | Version | 1 | Int | Protocol Version (0x01) |
| | Token | 16 | Char | Channel-Auth-Token (RANDOMIZED IN JSON ENCRYPTED VALUE) |
| | Data Size | 2 | Int | Data size |
| Data | JSON Data | Variable | Char | JSON DATA INCLUDING {} |

FIG. 6

| JSON MSGTYPE CLASSIFICATION /DESCRIPTION | DESCRIPTION |
|---|---|
| GET_AP_STB_DATA_REQ | REQUEST SETTING/STATUS FROM SET-TOP BOX (STB) BY AP |
| SET_AP_STB_DATA_REQ | REQUEST SETTING FROM STB BY AP |
| GET_STB_AP_DATA_REQ | REQUEST SETTING/STATUS FROM AP BY STB |
| SET_STB_AP_DATA_REQ | REQUEST SETTING FROM AP BY STB |
| NOTIFY_AP_STB_DATA | DELIVER SETTING/STATUS RESULT TO STB BY AP |
| NOTIFY_STB_AP_DATA | DELIVER SETTING/STATUS RESULT TO AP BY STB |
| RESERVED_1 | Reserved 1 |
| RESERVED_2 | Reserved 2 |

FIG. 7A

| REQUEST PARAMETERS | VALUE (MIN/MAX)/ | MANDATORY OR NOT | DESCRIPTION |
|---|---|---|---|
| UE:Model | String (8/32) | M | DEVICE MODEL NAME<br>-ENGLISH LETTERS (UPPERCASE AND LOWERCASE), NUMBERS, SPECIAL CHARACTERS<br>(E.G., MK206S) |
| UE:Binary | String (8/32) | M | BINARY VERSION NAME<br>-ENGLISH LETTERS (UPPERCASE AND LOWERCASE), NUMBERS, SPECIAL CHARACTERS<br>(E.G., V1.0.0) |
| UE:MAC | String (17) | M | MAC ADDRESS UPPERCASE<br>(E.G., AA:BB:CC:DD:EE:FF) |
| UE:MsgType | String (10/19) | M | SEE MSGTYPE IN TABLE 4-5 |
| UE:Msgid | String (31) | M | MESSAGE CLASSIFICATION ID<br>- TIME, MONTH, YEAR_RANDOM 16 DIGITS<br>(E.G., 16:31:17 ON NOVEMBER 12, 2021)<br>20211112163117_1234567890ABCD EF) |
| UE:Status | String (2/19) | M | UE STATUS INFORMATION<br>OK: NORMAL OPERATION<br>REBOOT: REBOOTING<br>UPGRADE: UPGRADING<br>UpgradeNotiReq : UPGRADE REQUEST NOTIFICATION<br>UPGRADENOTICOMPLETE: UPGRADE COMPLETION NOTIFICATION<br>FAILDNS: DNS SERVER ACCESS UNAVAILABLE<br>FAILAPIP: IP ALLOCATION UNAVAILABLE BY AP<br>FAILAPINTERNET: NO INTERNET ACCESS BY AP |
| AP:FactoryMode | String (2/3) | O | SET TO FACTORY MODE (MASS PRODUCTION MODE)<br>(CHECK BUTTON, SSID, PASSWORD, MAC)<br>ON: ACTIVATED<br>OFF: DEACTIVATED |
| AP:SetButton | String (3/3) | O | AP BUTTON SETTING<br>PBC: WIRELESS AUTO SETTING (WPS) |
| AP:NetworkType | String (6/10) | O | IP ALLOCATION POLICY<br>KTMODE: KT MODE<br>SHAREMODE: ROUTER MODE<br>BRIDGEMODE: BRIDGE MODE |
| AP:IPType | String (6/8) | O | DHCP: AUTO IP<br>STATICIP: STATIC IP |

FIG. 7B

| | | | |
|---|---|---|---|
| AP:IPAddress | String<br>(7/15) | O | IP VALUE<br>(E.G., 10.1.1.12) |
| AP:Subnetmask | String<br>(7/15) | O | Subnet Mask VALUE<br>(E.G., 255.255.255.0) |
| AP:Gateway | String<br>(7/15) | O | Gateway VALUE<br>(E.G., 10.1.1.1) |
| AP:PrimaryDNS | String<br>(7/15) | O | PRIMARY DNS VALUE<br>(E.G., 168.126.63.2) |
| AP:SecondaryDNS | String<br>(7/15) | O | SECONDARY DNS VALUE<br>(E.G., 168.126.63.2) |
| AP:WiFi:Frequency | String<br>(1/2) | O | 2G : WiFi 2.4GHz<br>5G : WiFi 5GHz<br>6G : WiFi 6GHz |
| AP:WiFi:Activation | String<br>(2/3) | O | ON: ACTIVATED<br>OFF: DEACTIVATED |
| AP:WiFi:Technology | String<br>(1/9) | O | 2.4GHz SETTING<br>(TYPE: b, g, n, ax, b/g/n/ax, b/g/n, g/n/ax, g/n, n/ax)<br>5GHz SETTING<br>(TYPE: a, n, ac, ax, a/n/ac/ax, a/n/ac, n/ac/ax, n/ac, a/n, ac/ax) |
| AP:WiFi:ChannelBand | String<br>(5/6) | O | WIFI CHANNEL BANDWIDTH<br>(TYPE: 20MHz, 40MHz, 80MHz, 160MHz)<br>E.G.: TRANSMISSION AT 20 MHZ |
| AP:WiFi:ChannelMode | String<br>(4/10) | O | CHANNEL MODE TYPE<br>AUTO: AUTOMATIC CHANNEL<br>AUTOSELECT: AUTOMATIC MANUAL SETTING<br>STATIC: MANUAL SETTING |
| AP:WiFi:Channel | String<br>(Variable) | O | 2.4GHz, 5GHz, 6GHz CHANNEL<br>E.G.: TRANSMISSION THROUGH CH36 AND CH153 WHEN SELECTED FOR 5 GHZ |
| AP:WiFi:TxPower | String<br>(2/3) | O | WIFI CHANNEL Power<br>(TYPE: 100, 75, 50, 25)<br>E.G.: TRANSMIT 100 IN CASE OF 100% |
| AP:WiFi:SSIDType | String<br>(2/4) | O | TYPE FOR EACH SSID<br>2G: SSID FOR 2.4GHZ<br>5GHz SSID<br>6GHz SSID<br>Mesh : EasyMesh SSID |

FIG. 7C

| | | | |
|---|---|---|---|
| AP:WiFi:SSIDActivation | String (2/3) | O | ON: ACTIVATED<br>OFF: DEACTIVATED |
| AP:WiFi:SSID | String (1/32) | O | WIFI SSID SETTING-KOREAN LANGUAGE SUPPORT<br>(E.G. : KT_GiGA_5G_XXXX) |
| AP:WiFi:Password | String (10/64) | O | WIFI SSID ENCRYPTION KEY<br>MIN 10 DIGITS TO MAX 64 DIGITS, ENGLISH LETTERS /NUMBER/ SPECIAL CHARACTERS WITHOUT SPACES<br>(E.G. : 1234567890) |
| AP:WiFi:Security | String (4/7) | O | NONE: UNSECURE<br>OWE : WPA3-OWE<br>WPA-PSK : WPA-PSK |
| AP:WiFi:WPAMode | String (3/13) | O | WPA SECURE MODE<br>( type : WPA, WPA2, WPA3, WPA/WPA2, WPA2/WPA3, WPA/WPA2/WPA3) |
| AP:WiFi:EncType | String (3/8) | O | ENCRYPTION METHOD<br>( type : TKIP, AES, TKIP/AES) |
| AP:WiFi:EasyMesh | String (2/3) | O | ON: ACTIVATED<br>OFF: DEACTIVATED |

FIG. 8

| Head | | | |
|---|---|---|---|
| Parameters | Size (Bytes) | Type | DESCRIPTION |
| Name | 8 | Char | S-Box |
| Version | 1 | Int | 0x01 |
| Token | 16 | Char | 1234567890123456 |
| Data Size | 2 | Int | DATA SIZE (INCLUDING HEAD AND JSON DATA) |

JSON Data

CRLF CRLF SETTINGS BEFORE INITIATING //JSON DATA

```
{
    "UE": {
        "Model": "MK206S",
        "Binary": "1.0.0",
        "MAC": "AA:BB:CC:DD:EE:FF"
        "MsgType": "GET_AP_STB_DATA_REQ",
        "MsgId": "20211112163117_1234567890ABCDEF"
    }
    "AP": {
        "NetworkType": "KTMode",
        "IPType": "StaticIP",
        "IPAddress": "10.1.1.12",
        "Subnetmask": "255.255.255.0"
        "Gateway": "10.1.1.1"
        "WiFi": [
            {
                "Frequency": "2G",
                "Activation": "Off",
            }
            {
                "Frequency": "5G",
                "Technology": "a/n/ac/ax",
                "ChannelBand": "80MHz"
                "ChannelMode": "Static",
                "Channel": "36,48",          //SELECT ONLY CH36 AND CH48 FOR 5 GHZ
                "SSIDType": "Mesh",
                "SSID": "테스트1",
                "Password": "12345678"
                "Security": "None"
        ],
    }
```

FIG. 9A

| RESPONSE PARAMETERS | VALUE (MIN/MAX) | DESCRIPTION |
|---|---|---|
| Code | String (3/3) | RESPONSE RESULT CODE<br>(E.G. : "201") |
| Message | String (8/255) | USER MESSAGE (ENGLISH LETTERS UPPERCASE AND LOWERCASE), NUMBERS, SPECIAL CHARACTERS)<br>(E.G.: FAILED TO RETRIEVE SSID)<br>WHEN JSON VALUE SETTING FAILS, SPECIFY SETTING FAILURE PARAMETER |
| UE:Model | String (8/32) | REQUESTED DEVICE MODEL NAME<br>(E.G. : MK206S) |
| UE:Binary | String (6/32) | AUTHORIZED DEVICE BINARY VERSION NAME<br>-English letters (uppercase and lowercase), numbers, special characters (e.g., V1.0.0) |
| UE:MAC | String (17) | REQUESTED DEVICE MAC ADDRESS<br>(E.G. : AA:BB:CC:DD:EE:FF) |
| UE:MsgType | String (10/19) | Refer to Table 4 MsgType<br>(E.G. : NOTIFY_AP_STB_DATA) |
| UE:MsgId | String (31) | MESSAGE CLASSIFICATION ID RESPONSE ID MUST MATCH REQUEST ID<br>-Random 16 characters<br>(E.G. : 2021.11.21. 16:31:17<br>20211112163117_1234567890ABCDEF) |
| UE:Status | String (2/22) | UE Status Information<br>OK: Normal Operation<br>REBOOT: REBOOTING<br>Upgrade : Upgrading<br>UPGRADENOTIRES: UPGRADE REQUEST NOTIFICATION RETURN<br>UPGRADENOTIRES: UPGRADE COMPLETION NOTIFICATION<br>FailDns: Unable Connect to DNS server<br>FailApIP : AP Unable to Assign IP<br>FailAPInternet : AP Not Connect to the Internet |
| UE:StatusTime | String (1/2) | SETTING STANDBY TIME FOR AP UNIT DISPLAYED IN PROGRESS BAR ON STB UNIT<br>(E.G.: 30 SEC), IF SET TO 0 SECONDS, IT IS APPLIED IMMEDIATELY |
| AP:FactoryMode | String (2/3) | Factory mode setting<br>(Check Button, SSID, Password, MAC)<br>ON: ACTIVATED<br>OFF: DEACTIVATED |
| AP:NetworkType | String (6/10) | IP Allocation Policy<br>KTMode : KT Mode<br>SharedMode : Shared Mode<br>BridgeMode : Bridge Mode |
| AP:IPType | String (6/8) | DHCP: Automatic IP<br>Static: Static IP |
| AP:IPAddress | String (7/15) | IP number<br>(E.G. : 10.1.1.12) |
| AP:Subnetmask | String (7/15) | Subnet Mask number<br>(E.G. : 255.255.255.0) |

FIG. 9B

| | | |
|---|---|---|
| AP:Gateway | String (7/15) | Gateway number<br>(e.g., 10.1.1.1) |
| AP:PrimaryDNS | String (7/15) | Default DNS number<br>(e.g., 168.126.63.2) |
| AP:SecondaryDNS | String (7/15) | Secondary DNS number<br>(e.g., 168.126.63.2) |
| AP:WiFi.Frequency | String (1/2) | 2G : WiFi 2.4GHz<br>5G : WiFi 5GHz<br>6G : WiFi 6GHz |
| AP:WiFi.Activation | String (2/3) | On : Acticate<br>Off : Deactivate |
| AP:WiFi.Technology | String (1/9) | 2.4GHz Setting<br>(type : b, g, n, ax, b/g/n/ax, b/g/n, g/n/ax, g/n, n/ax)<br>5GHz Setting<br>(type : a, n, ac, ax, a/n/ac/ax, a/n/ac, n/ac/ax, n/ac, a/n, ac/ax) |
| AP:WiFi.ChannelBand | String (5/6) | WiFi channel bandwidth<br>( type : 20MHz, 40MHz, 80MHz, 160MHz)<br>e.g., Transmit at 20MHz |
| AP:WiFi.ChannelMode | String (4/10) | Channel Mode Types<br>Auto: Automatic Channel<br>AutoSelect: Automatic Manual Setting<br>Static: Manual Setting |
| AP:WiFi.Channel | String (Variable) | 2.4GHz, 5GHz, 6GHz Channels(e.g<br>(e.g., When selecting channels 36CH and 153CH for 5GHz, transmit as 36,153) |
| AP:WiFi.ServiceChannel | String (1/3) | WIFI CHANNEL ACTUALLY IN USE<br>E.G.: 5 GHZCH40 FOR 80 MHZ |
| AP:WiFi.TxPower | String (2/3) | WiFi Transmission Power<br>(Type: 100, 75, 50, 25)<br>e.g., In case of 100%, transmit as 100++ |
| AP:WiFi.SSIDType | String (2/4) | SSID Type<br>2G : 2.4GHz SSD<br>5G : 5GHz SSD<br>6G : 6GHz SSD<br>Mesh : EasyMesh SSID |
| AP:WiFi.SSIDActivation | String (2/3) | On : Acticate<br>Off : Deactivate |
| AP:WiFi.SSID | String (1/32) | WiFi SSID Setting – Character Support<br>(e.g., KT_GIGA_5G_XXXX) |
| AP:WiFi.Password | String (10/64) | SSID Password(e.g., 1234567890)<br>(e.g., 1234567890) |
| AP:WiFi.Security | String | None: Unsecured |

FIG. 9C

| | | |
|---|---|---|
| | (4/7) | OWE : WPA3-OWE<br>WPA-PSK : WPA-PSK |
| AP:WiFi:WPAMode | String<br>(3/13) | WPA Secure Mode<br>(Type: WPA, WPA2, WPA3,<br>WPA/WPA2, WPA2/WPA3,<br>WPA/WPA2/WPA3) |
| AP:WiFi:EncType | String<br>(3/8) | Encryption Type<br>(Type : TKIP, AES, TKIP/AES) |
| AP:WiFi:EasyMesh | String<br>(2/3) | ON: ACTIVATED<br>OFF: DEACTIVATED |
| AP:WiFi:ScanResultRSSI | String<br>(2/4) | WIFI SCAN RESULT RSSI VALUE<br>DURING MASS PRODUCTION TESTING, ONLY ONE AP IS TESTED<br>(E.G.: -28 DBM FOR -28) |

FIG. 10

| RESPONSE CODE | NOTIFICATION |
|---|---|
| 200 | SUCCESS |
| 201 | DURING WIFI SETTING (AFTER SETTING REQUEST, WIFI INTERFACE TYPICALLY TAKES ABOUT 30 SECONDS) |
| 401 | FAILURE (CHANNEL-AUTH-TOKEN MISSING ERROR) |
| 402 | FAILURE (FAILURE IN JSON BODY DECRYPTION) |
| 403 | FAILURE (MAC ADDRESS FORMAT ERROR) |
| 411 | FAILURE (NOT A SERVICEABLE MODE) |
| 421 | FAILURE (JSON SETTING FAILURE) |
| 432 | FAILURE (USE OF FREQUENCY OF 2.4 GHZ BY AP IS TURNED OFF ANDFREQUENCY OF 2.4 GHZ CANNOT BE USED) |
| 435 | FAILURE (USE OF FREQUENCY OF 5 GHZ BY AP IS TURNED OFF AND FREQUENCY OF 5 GHZ CANNOT BE USED) |
| 499 | FAILURE (OTHER UNDEFINED ERROR) |
| 501 | FAILURE (FAILURE IN RE-REQUEST WITH SAME VALUE AS SETTING REQUEST VALUE) |

FIG. 11

| Head | | | |
|---|---|---|---|
| Parameters | Size (Bytes) | Type | DESCRIPTION |
| Name | 8 | Char | S-Box |
| Version | 1 | Int | 0x01 |
| Token | 16 | Char | 1234567890123456 |
| Data Size | 2 | Int | DATA SIZE (INCLUDING HEAD AND JSON DATA) |
| JSON Data | | | |

```
CRLF    CRLF SETTINGS BEFORE INITIATING //JSON DATA
{
    "Code": 200,
    "Message": "SETTINGS HAVE BEEN COMPLETED"
    "UE": {
        "Model": "MK206S",
        "Binary": "1.0.0",
        "MAC": "AA:BB:CC:DD:EE:FF"
        "MsgType": "NOTIFY_STB_AP_DATA",
        "MsgId": "20211112163117_1234567890ABCDEF",
        "Status": "OK",
        "StatusTime": "30"
    }
}
CRLF    CRLF SETTINGS AT THE END OF //JSON DATA
```

FIG.17A

| CHANNEL MODE | CHANNEL BANDWIDTH | CHANNEL | SELECT CHANNEL |
|---|---|---|---|
| AUTO | 20MHz | 1, 2, 3, 4, 5, 6, 7, 8, 9, 10, 11, 12, 13 | UNABLE TO SELECT CHANNEL |
| | 40MHz | | |
| AUTO (OPTIONAL) | 20MHz | 1, 2, 3, 4, 5, 6, 7, 8, 9, 10, 11, 12, 13 | INITIAL VALUE 1, 5, 9 |
| | 40MHz | | |
| MANUAL | 20MHz | 1, 2, 3, 4, 5, 6, 7, 8, 9, 10, 11, 12, 13 | SELECT FROM CHANNEL LIST |
| | 40MHz | | |

FIG. 17B

| CHANNEL MODE | CHANNEL BANDWIDTH | CHANNEL | SELECT CHANNEL |
|---|---|---|---|
| AUTO | 20MHz | 36, 40, 44, 48, 52, 56, 60, 64, 100, 104, 108, 112, 116, 120, 124, 128, 132, 136, 140, 144, 149, 153, 157, 161, 165 | UNABLE TO SELECT CHANNEL, SELECT FROM BNAD A (36 TO 48) AND BAND D (149 TO 165) |
| | 40MHz<br>80MHz | 36, 40, 44, 48, 52, 56, 60, 64, 100, 104, 108, 112, 116, 120, 124, 128, 132, 136, 140, 144, 149, 153, 157, 161 | UNABLE TO SELECT CHANNEL, SELECT FROM BNAD A (36 TO 48) AND BAND D (149 TO 161) |
| AUTO (OPTIONAL) | 20MHz | 36, 40, 44, 48, 52, 56, 60, 64, 100, 104, 108, 112, 116, 120, 124, 128, 132, 136, 140, 144, 149, 153, 157, 161, 165 | INITIAL VALUE BAND A (36 TO 48) AND BAND D (149 TO 165) |
| | 40MHz<br>80MHz | 36, 40, 44, 48, 52, 56, 60, 64, 100, 104, 108, 112, 116, 120, 124, 128, 132, 136, 140, 144, 149, 153, 157, 161 | INITIAL VALUE BAND A (36 TO 48) AND BAND D (149 TO 161) |
| MANUAL | 20MHz | 36, 40, 44, 48, 52, 56, 60, 64, 100, 104, 108, 112, 116, 120, 124, 128, 132, 136, 140, 144, 149, 153, 157, 161, 165 | SELECT FROM CHANNEL LIST |
| | 40MHz<br>80MHz | 36, 40, 44, 48, 52, 56, 60, 64, 100, 104, 108, 112, 116, 120, 124, 128, 132, 136, 140, 144, 149, 153, 157, 161 | |

FIG. 24

| Head | | | |
|---|---|---|---|
| Parameters | Size (Bytes) | Type | DESCRIPTION |
| Name | 8 | Char | S-Box |
| Version | 1 | Int | 0x01 |
| Token | 16 | Char | 1234567890123456 |
| Data Size | 2 | Int | DATA SIZE (INCLUDING HEAD AND JSON DATA) |

JSON Data

CRLF CRLF SETTINGS BEFORE INITIATING //JSON DATA

```
{
    "UE": {
        "Model": "KM206S",
        "Binary": "1.0.0",
        "MAC": "AA:BB:CC:DD:EE:FF"
        "MsgType": "NOTIFY_STB_AP_DATA",
        "MsgId": "20220310163117_1234567890ABCDEF",
        "Status": "UpgradeNotiReq"
    }
}
```

CRLF CRLF SETTINGS AT THE END OF //JSON DATA

FIG. 25

| Head | | | |
|---|---|---|---|
| Parameters | Size (Bytes) | Type | DESCRIPTION |
| Name | 8 | Char | S-Box |
| Version | 1 | Int | 0x01 |
| Token | 16 | Char | 1234567890123456 |
| Data Size | 2 | Int | DATA SIZE (INCLUDING HEAD AND JSON DATA) |

JSON Data

CRLF CRLF SETTINGS BEFORE INITIATING //JSON DATA

```
{
    "Code": 200,
    "Message": "SETTINGS HAVE BEEN COMPLETED"
    "UE": {
        "Model": "MK206S",
        "Binary": "1.0.0",
        "MAC": "AA:BB:CC:DD:EE:FF"
        "MsgType": "NOTIFY_AP_STB_DATA",
        "MsgId": "20211112163117_1234567890ABCDEF",
        "Status": "UpgradeNotiRes"
    }
}
```

CRLF CRLF SETTINGS AT THE END OF //JSON DATA

INTEGRATED TERMINAL DEVICE AND CONTROL METHOD OF INTEGRATED TERMINAL DEVICE

CROSS REFERENCE TO RELATED APPLICATIONS

This application is a National Stage Patent Application of PCT International Patent Application No. PCT/KR2023/005684 (filed on Apr. 26, 2023) under 35 U.S.C. § 371, which claims priority to Korean Patent Application Nos. 10-2022-0051507 (filed on Apr. 26, 2022), 10-2022-0051508 (filed on Apr. 26, 2022), 10-2022-0051515 (filed on Apr. 26, 2022), 10-2023-0054396 (filed on Apr. 26, 2023), 10-2023-0054397 (filed on Apr. 26, 2023), and 10-2023-0054398 (filed on Apr. 26, 2023), the teachings of which are incorporated herein in their entireties by reference.

TECHNICAL FIELD

The present disclosure relates to a terminal device integrating and utilizing an access point (AP), a set-top box, and an AI speaker and a control method of the terminal device.

BACKGROUND

Recently, there has been an increasing demand for APs (Access Points) and set-top boxes installed in households with the use of broadcasting services, such as cable TV and Internet protocol TV (IPTV). An AP is a device connected to wireless Internet to transmit and receive Wi-Fi signals and thus enables a user to use Internet services on various devices, such as smartphones and PCs, through a Wi-Fi connection with the AP. Also, the user can use a set-top box connected to a TV to view terrestrial TV and IPTV, and can also install and use an AI speaker that recognizes voice commands of the user and processes the commands or provides related information.

Despite the high demand for APs, set-top boxes, and AI speakers, each device is often configured as a separate device. In such cases, even with the miniaturization of the devices, each device still requires a separate space, which degrades the utilization of home space. Each device requires a separate power supply and thus further requires a plurality of power cables, which can harm the home's interior or aesthetics and increase power consumption due to the power usage of each device. Further, each user needs to purchase the devices individually to use the respective services, which leads to increased costs for setting up a related system.

In response to this demand, attempts have been made to integrate the above-described devices into a single terminal. However, the efficiency decreases due to differences in operating method and format of data input and output among the devices.

DISCLOSURE OF THE INVENTION

Problems to be Solved by the Invention

In view of the foregoing, the present disclosure is conceived to provide an integrated terminal device in which a home AP, a set-top box, and an AI speaker are integrated to enhance the utilization of home space or power consumption efficiency.

Also, the present disclosure is conceived to provide an integrated terminal device in which a home AP, a set-top box, and an AI speaker are integrated to reduce equipment purchase costs of a user who wants to use related services.

Further, the present disclosure is conceived to provide an integrated terminal device in which a home AP, a set-top box, and an AI speaker are integrated to enable the use of Internet services and TV control through a single device and thus enhance convenience.

However, the problems to be solved by the present disclosure are not limited to the above-described problems. There may be other problems to be solved by the present disclosure.

Means for Solving the Problems

An aspect of the present disclosure provides an integrated terminal device, including: an access point (AP) unit that provides a wireless LAN function; and a set-top box (STB) unit that is connected to the AP unit through Ethernet, and the AP unit initiates a home network communication with the STB unit through a Dynamic Host Configuration Protocol (DHCP) and assigns an Internet protocol (IP) address to the STB unit, and the AP unit and the STB unit transmit and receive packets to and from each other through an inter-process communication (IPC).

The above-described aspects are provided by way of illustration only and should not be construed as liming the present disclosure. Besides the above-described embodiments, there may be additional embodiments described in the accompanying drawings and the detailed description.

Effects of the Invention

According to any one of the above-described means for solving the problems of the present disclosure, it is possible to provide an integrated terminal device in which a home AP, a set-top box, and an AI speaker are integrated to enhance the utilization of home space or power consumption efficiency.

Also, according to the present disclosure, it is possible to provide an integrated terminal device in which a home AP, a set-top box, and an AI speaker are integrated to reduce equipment purchase costs of a user who wants to use related services.

Further, according to the present disclosure, it is possible to provide an integrated terminal device in which a home AP, a set-top box, and an AI speaker are integrated to enable the use of Internet services and TV control through a single device and thus enhance convenience.

BRIEF DESCRIPTION OF THE DRAWINGS

FIG. 5 is an example depiction to explain the configuration of a packet transmitted by the AP unit and the STB unit in the integrated terminal device in accordance with an embodiment of the present disclosure.

FIG. 6 is an example depiction to explain message type information of data in the packet transmitted by the AP unit and the STB unit in the integrated terminal device in accordance with an embodiment of the present disclosure.

FIG. 7A to FIG. 7C are example depictions to explain request parameters of the data in the packet transmitted by the AP unit and the STB unit in the integrated terminal device in accordance with an embodiment of the present disclosure.

FIG. 8 is an example depiction to explain a format of a request message transmitted by the AP unit and the STB unit in the integrated terminal device in accordance with an embodiment of the present disclosure.

FIG. 9A to FIG. 9C are example depictions to explain response parameters of the data in the packet transmitted by the AP unit and the STB unit in the integrated terminal device in accordance with an embodiment of the present disclosure.

FIG. 10 is an example depiction to explain response codes of the data in the packet transmitted by the AP unit and the STB unit in the integrated terminal device in accordance with an embodiment of the present disclosure.

FIG. 11 is an example depiction to explain a format of a response message transmitted by the AP unit and the STB unit in the integrated terminal device in accordance with an embodiment of the present disclosure.

FIG. 17A and FIG. 17B are example depictions to explain channel values that can be set depending on the frequency band or channel mode when the AP unit is controlled through the STB unit in the integrated terminal device in accordance with an embodiment of the present disclosure.

FIG. 24 is an example depiction to explain a format of the request message transmitted by the AP unit and the STB unit in the integrated terminal device in accordance with an embodiment of the present disclosure.

FIG. 25 is an example depiction to explain a format of the response message transmitted by the AP unit and the STB unit in the integrated terminal device in accordance with an embodiment of the present disclosure.

BEST MODE FOR CARRYING OUT THE INVENTION

Figure 1:
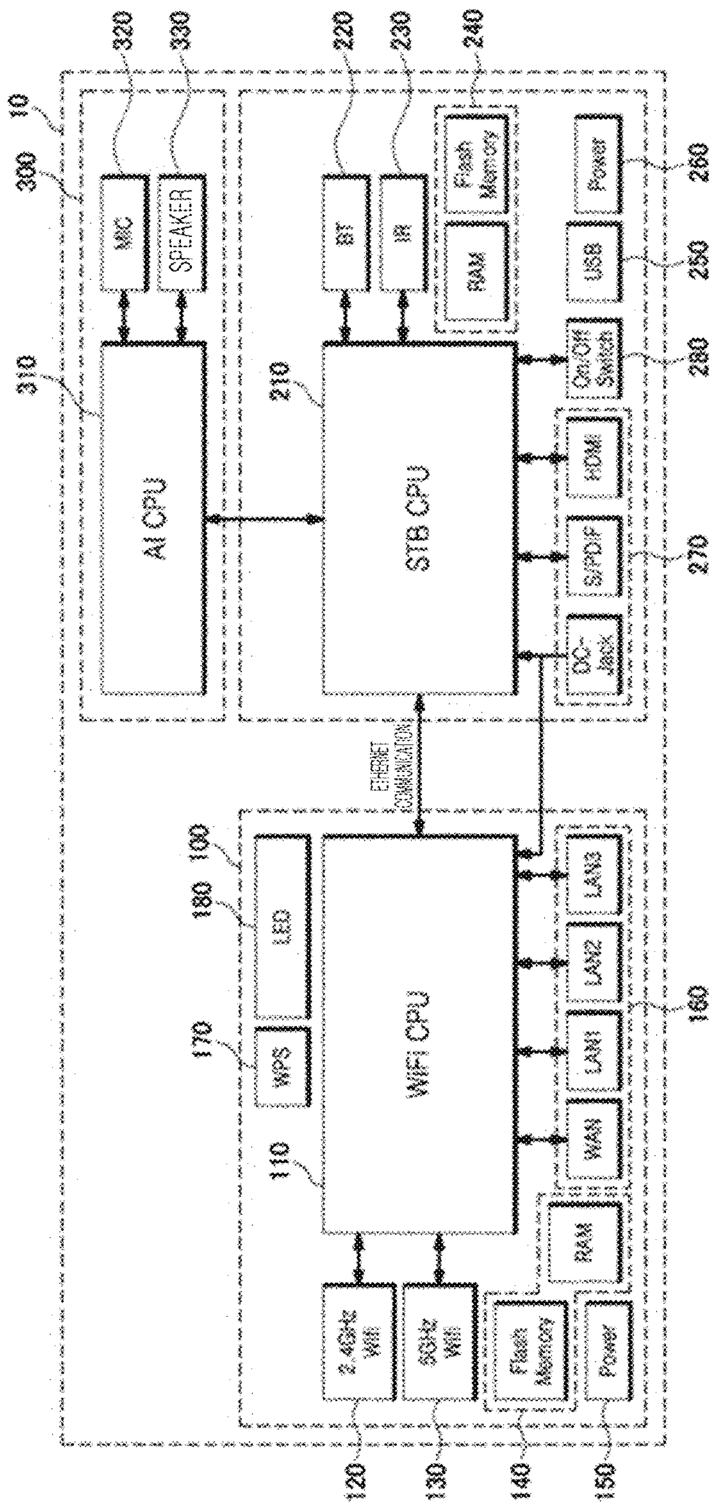
FIG. 1 is a configuration view of an integrated terminal device in accordance with an embodiment of the present disclosure.

An integrated terminal device includes: an access point (AP) unit that provides a wireless LAN function; and a set-top box (STB) unit that is connected to the AP unit through Ethernet, and the AP unit initiates a home network communication with the STB unit through a Dynamic Host Configuration Protocol (DHCP) and assigns an Internet protocol (IP) address to the STB unit, and the AP unit and the STB unit transmit and receive packets to and from each other through an inter-process communication (IPC).

An integrated terminal device includes: an access point (AP) unit that provides a wireless LAN function; and a set-top box (STB) unit that is connected to the AP unit through Ethernet, and the AP unit initiates a home network communication with the STB unit through a Dynamic Host Configuration Protocol (DHCP) and assigns an Internet protocol (IP) address to the STB unit, the STB unit transmits activation request information to a management server through the AP unit and receives activation response information from the management server through the AP unit.

MODE FOR CARRYING OUT THE INVENTION

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the device.

Hereinafter, an embodiment of the present disclosure will be described in detail with reference to the accompanying drawings.

FIG. 1 is a configuration view of an integrated terminal device 10 in accordance with an embodiment of the present disclosure.

Referring to FIG. 1, the integrated terminal device 10 may include an AP unit 100, an STB unit 200, and an AI speaker unit 300.

AP stands for Access Point, and the AP refers to a device connected to the Internet through a wireless LAN (Wi-Fi). Typically, devices using the wireless LAN (e.g., a laptop computer, a smartphone, a tablet PC, etc.) may be connected to the AP to access the Internet. The AP can serve as a bridge between wired internet and wireless LAN.

The STB refers to a digital device that connects various media, such as TV and the Internet. The STB enables a user to view and record Internet broadcast or view various contents connected to the Internet through TV. The STB primarily functions to decode TV signals for viewing and provides various functions of a digital video recorder (DVR), a network media player, etc.

The AI speaker is a speaker equipped with artificial intelligence that can interact with the user by using voice recognition and natural language processing. The AI speaker provides various functions, such as playing music, providing weather information, and controlling smart home devices, and can operate in response to voice commands.

When the above-described devices, particularly the AP, the STB, and the AI speaker, are integrated, each device needs to retain its unique function. When the AP is integrated with the STB, the STB for IPTV and terrestrial broadcasting needs to be able to use Internet connection of the AP, and a linkage method between the AP and the STB needs to be established in order for the STB to control the AP.

For example, if the user cannot watch IPTV and wants to check the Internet connection, he/she can check the Internet connection and change the AP settings through the AP. In this case, an integrated terminal device in which the AP and the STB are integrated needs to link the IPTV with the AP. Also, the integrated terminal device needs to be configured to read the status of the AP and change the AP settings on the TV for the IPTV STB.

Also, when the user upgrades firmware of the STB, Internet disconnection may occur during the firmware upgrade, and, thus, the STB may not be properly upgraded and may malfunction. Therefore, the integrated terminal device in which the AP and the STB are integrated needs to control the AP to suppress Internet disconnection or rebooting of the AP and thus to provide stability during the upgrade of the STB.

Further, when the user changes the AP settings through the AI speaker, the AI speaker needs to be linked to the AP to read the status of the AP, inform the user of the status of the AP, and allow the user to change the AP settings.

The integrated terminal device 10 according to an embodiment of the present disclosure may be seen as a single packaged terminal device from the outside, but may include components that perform the functions of the above-described AP, STB and AI speaker. That is, the integrated terminal device 10 can integrate the AP, the STB, and the AI speaker into a single terminal device.

In the following description, a part of the integrated terminal device 10 that functions as the AP will be referred to as the AP unit 100, a part functioning as the STB will be referred to as the STB unit 200, and a part functioning as the AI speaker will be referred to as the AI speaker unit 300.

Referring to FIG. 1, the AP unit 100 may include a Wi-Fi CPU 110. The Wi-Fi CPU 110 is a central processing unit that processes data input for operation of the AP unit 100. The Wi-Fi CPU 110 can provide a wireless signal with a bandwidth of 2.4 GHz Wi-Fi 120 or 5 GHz Wi-Fi 130 depending on the settings or functions. The Wi-Fi CPU 110 may be connected to a storage device, such as flash memory or RAM 140, to input and output data, and may also be connected to a power supply 150 of the integrated terminal device 10. The Wi-Fi CPU 110 may be connected to WAN, LAN1, LAN2, and LAN3 160, which are wired data input/output ports, and may be connected to other devices through a wireless LAN by inputting a WPS (Wi-Fi Protected Setup) 170. Further, the Wi-Fi CPU 110 may display data input/output status through an LED 180.

The STB unit 200 may include an STB CPU 210. The STB CPU 210 is a central processing unit that processes data input for operation of the STB unit 200. The STB CPU 210 can provide functions, such as wireless Bluetooth connection 220 or infrared connection 230, depending on the settings or functions. The STB CPU 210 may be connected to a storage device, such as flash memory or RAM 240, to input and output data, and may also be connect to an external device through a USB port 250. Further, the STB CPU 210 may be connected to a power supply 260 of the integrated terminal device 10. Furthermore, the STB CPU 210 may transmit a display signal to a TV through ports 270, such as DC-JACK, S/PDIF, and HDMI, and may be turned on or off using an On/Off switch 280. The On/Off switch 280 may be located on the exterior of the integrated terminal device 10 in order for the user to easily control power of the STB unit 200.

The AI speaker unit 300 may include an AI CPU 310. The AI CPU 310 is a central processing unit that processes data input for operation of the AI speaker unit 300. The AI speaker unit 300 can recognize and analyze voice signals input through a microphone 320, convert them into appropriate text messages, and process predetermined commands based on these text messages. The AI CPU 310 may convert processing results or externally input data into audio signals and output them through a speaker 330. In another embodiment of the present disclosure, the functions of the AI speaker unit 300 may be included in the functions of the STB unit 200. That is, a microphone or a speaker may be connected to the STB CPU 210, which can recognize and process voice input, convert a processing result into an audio signal, and output it through the speaker.

In an embodiment of the present disclosure, the AP unit 100 and the STB unit 200 may be connected to each other for Ethernet communication and may transmit and receive packets to and from each other through IPC (Inter-Process Communication).

Although FIG. 1 shows the AP unit 100 and the STB unit 200 connected through Ethernet, other internal interfaces, such as SD interface or USB interface, may be configured. The AP unit 100 and the STB unit 200 may be connected in a bus format according to IEEE 802.3.

Since the AP unit 100 and the STB unit 200 of the integrated terminal device 10 are physically connected to each other within the integrated terminal device 10 as described above, their connection is not exposed to the outside. Therefore, it is possible to enhance the utilization of home space and also minimize harm to the home's interior or aesthetics.

Figure 2:
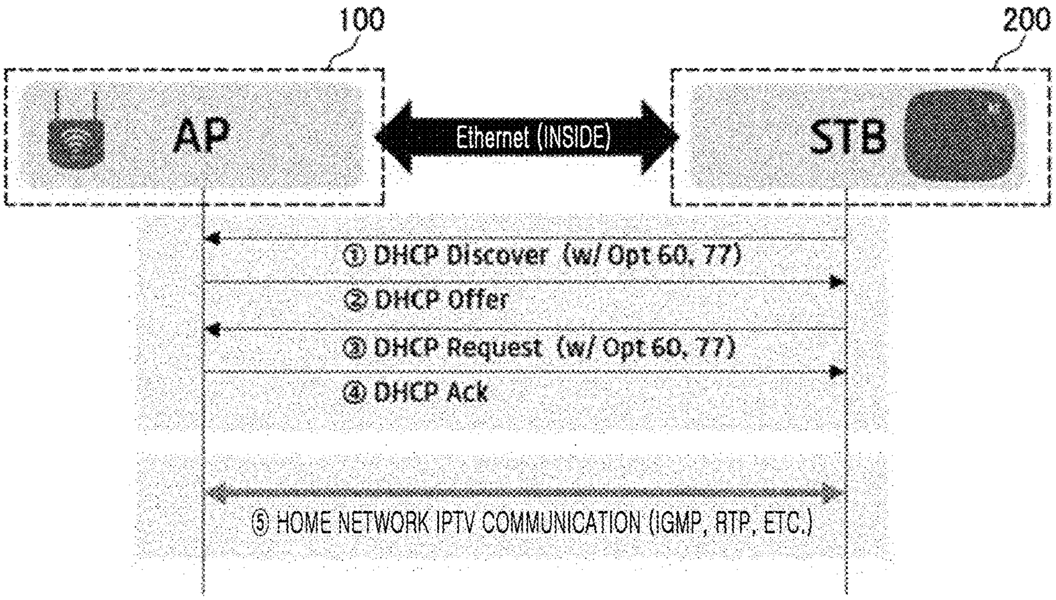
FIG. 2 is an example depiction to explain a process of assigning an IP according to a DHCP in the integrated terminal device in accordance with an embodiment of the present disclosure.

FIG. 2 is an example depiction to explain a process of assigning an IP according to a DHCP in the integrated terminal device in accordance with an embodiment of the present disclosure.

The AP unit 100 may initiate a home network communication with the STB unit 200 through a Dynamic Host Configuration Protocol (DHCP) and assign an IP address to the STB unit 200.

In general, a conventional AP is connected to an external Internet network and assigned a unique IP address for communication, and may include Wi-Fi and wired LAN as sub-devices connected to the AP. A conventional STB is connected to the conventional AP through a wireless or wired LAN device, and may be connected to the Internet network as a sub-device of the AP.

In the integrated terminal device 10 according to an embodiment of the present disclosure, the AP unit 100 and the STB unit 200 are configured as an integrated terminal including a home AP and Ethernet through an Ethernet GPIO interface instead of an Ethernet cable. Thus, the integrated terminal device 10 can have a simple configuration without direct LAN cables. Therefore, it is possible to enhance the utilization of interior space. Accordingly, the STB can receive IPTV packets as a sub-device of the home AP.

It can be seen from FIG. 2 that the AP unit 100 is connected to the STB unit 200 through Ethernet within the integrated terminal device 10 and assigns an IP address to the STB unit 200.

More specifically, the AP unit 100 enables the STB unit 200 to receive network configuration information, such as IP address, subnet mask, and default gateway, through the DHCP. When the STB unit 200 broadcasts a DHCP discover message via Opt 60 or Opt 77, the AP unit 100 recognizes it and transmits a DHCP offer message to the STB unit 200. Then, the STB unit 200 may transmit a DHCP request message to the AP unit 100 via Opt 60 or Opt 77. Thereafter, when the AP unit 100 responds with a DHCP Ack message, a home network is constructed between the AP unit 100 and the STB unit 200, which enables multimedia streaming through a protocol, such as an Internet Group Management Protocol (IGMP) or a Real-time Transport Protocol (RTP).

In the embodiment shown in FIG. 2, an IP allocation method of the AP unit 100 may vary depending on a predetermined IP allocation mode of the AP unit 100. For example, the IP allocation method may vary depending on whether the AP unit 100 is in a router mode in which the AP unit 100 assigns different internal IP addresses to its sub-devices and the sub-devices have a single public IP address for external access or the AP unit 100 is in a bridge mode in which the AP unit 100 functions as a switching hub and has a separate public IP address for each of the devices.

Figure 3:
FIG. 3 is an example depiction to explain linkage between an AP unit and an STB unit in the integrated terminal device through an IPC in accordance with an embodiment of the present disclosure.

FIG. 3 is an example depiction to explain linkage between the AP unit 100 and the STB unit 200 in the integrated terminal device 10 through the IPC in accordance with an embodiment of the present disclosure.

The Wi-Fi CPU 110 of the AP unit 100 and the STB CPU 210 of the STB unit 200 may be connected within the integrated terminal device 10 through an inter-process communication (IPC). This internal linkage between the two CPUs can be implemented by transmitting data through any port. For example, the Wi-Fi CPU 110 of the AP unit 100 and the STB CPU 210 of the STB unit 200 may be connected to each other through a port 7654 to transmit and receive data to and from each other.

In the example shown in FIG. 3, the AP unit is assigned an IP address of 10.0.0.2, and the STB unit 200 is assigned an IP address of 10.0.0.8. In the example shown in FIG. 3, if the AP unit 100 is set to a bridge mode for its internet network connection, it may assign a public IP address to its sub-device. In an embodiment of the present disclosure, the STB unit 200 may be configured as a sub-device of the AP unit 100.

When the internal linkage between the AP unit 100 and the STB unit 200 is implemented through the IPC, the STB unit 200 with IP address 10.0.0.8 may not be allowed to transmit an ARP Requests to an external public network. This is because when the STB unit 200 transmits an ARP Request to the outside, the STB unit 200 receives a response from the AP unit 100, which is unnecessary for both the AP unit 100 and its sub-device, the STB unit 200.

The AP unit 100 and the STB unit 200 are configured to transmit and execute status information and commands for each other through the IPC. To this end, a socket of a connection interface between the AP unit 100 and the STB unit 200 can be maintained in an open state.

Figure 4:
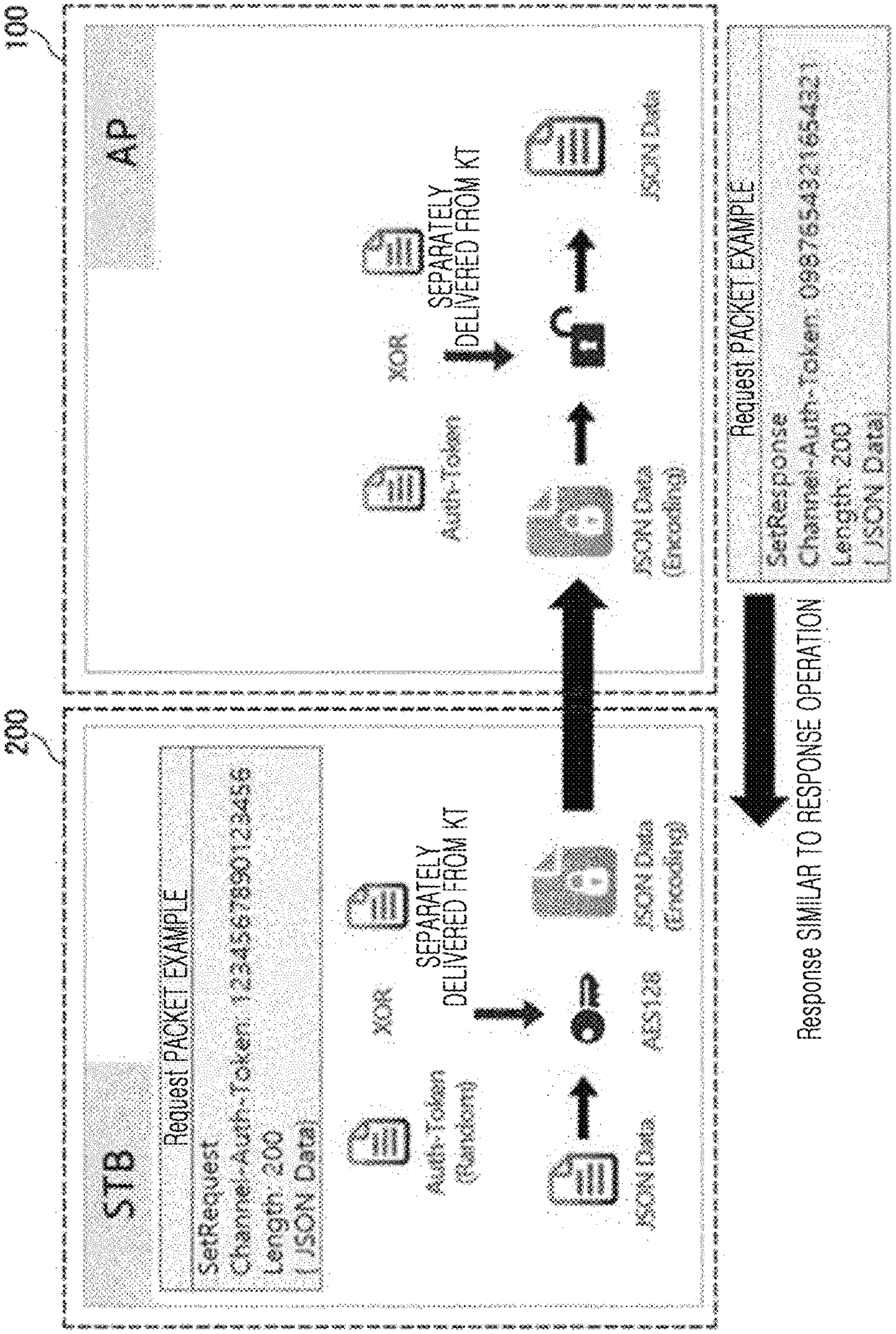
FIG. 4 is an example depiction to explain a process of transmitting and decoding encoded data by the AP unit and the STB unit in the integrated terminal device in accordance with an embodiment of the present disclosure.

FIG. 4 is an example depiction to explain a process of transmitting and decoding encoded data by the AP unit and the STB unit in the integrated terminal device in accordance with an embodiment of the present disclosure.

FIG. 4 illustrates a process of transmitting a request packet generated by the STB unit 200 to the AP unit 100 and a process of transmitting a response packet corresponding to the request packet by the AP unit 100. As will be described later, data portions of the packets transmitted between the AP unit 100 and the STB unit 200 may be in the form of JavaScript Object Notation (JSON). Further, a header of the request packet from the STB unit 200 may include token information (Channel-Auth-Token) for data encryption. Herein, the token information is randomly generated and may have a size of 16 bytes*n.

More specifically, in FIG. 4, a process of encrypting the packet may include a process of generating token information in the header and receiving a separately delivered symmetric key by the STB unit 200, and a process of encoding a combination of the token information and the symmetric key according to AES-128 before transmission.

Herein, the symmetric key may be set to a size of 16 bytes*n, and if smaller, it can be padded with 0x00 to reach 16 bytes. AES-128 is one of encryption schemes known as the Advanced Encryption Standard (AES), and is widely used as a symmetric key encryption algorithm and was adopted by the U.S. National Institute of Standards and Technology (NIST) in 2001. AES-128 encrypts data by using a 128-bit symmetric key, and the same secret key is used for both encryption and decryption. AES-128 offers secure key generation and management, high levels of security, and fast processing speeds.

A decryption process shown in FIG. 4 may be performed by the AP unit 100 by combining the token information and the symmetric key to decrypt the received packet. Then, encryption and decryption performed while the AP unit 100 generates and transmits the response packet corresponding to the request packet of the STB unit 200 may be performed in the above-described manner.

Although FIG. 4 illustrates that AES-128 is used for data encryption and decryption, AES-192, AES-256, or alternative encryption/decryption schemes may be used for stronger security.

FIG. 5 is an example depiction to explain the configuration of a packet transmitted by the AP unit and the STB unit in the integrated terminal device in accordance with an embodiment of the present disclosure.

FIG. 5 shows an example of a packet structure in the form of JSON. "Name" in the header of the packet may be a parameter that represents a name of an integrated terminal device, while "Version" may refer to a version of a protocol configured in the integrated terminal device. "Token" may refer to token information used in the encryption and decryption process described above with reference to FIG. 4 and may serve as a channel access token for communication between the AP unit and the STB unit. "Data Size" may refer to the size of the header and the data portion in the packet. The data portion (Data) refers to a data region in the form of JSON including substantial data for requests or responses transmitted through the packet.

FIG. 6 is an example depiction to explain message type information of data in the packet transmitted by the AP unit and the STB unit in the integrated terminal device in accordance with an embodiment of the present disclosure.

The message type information may refer to information configured to define at least one of a type of a request GET_AP_STB_DATA_REQ of the AP unit to get data from the STB unit, a type of a request SET_AP_STB_DATA_REQ of the AP unit to set data from the STB unit, a type of a response NOTIFY_AP_STB_DATA of the AP unit to the request of the STB unit, a type of a request GET_STB_AP_REQ of the STB unit to get data from the AP unit, a type of a request SET_STB_AP_REQ of the STB unit to set data from the AP unit, and a type of a response NOTIFY_STB_AP_DATA of the STB unit to the request of the AP unit.

During communication, the AP unit and the STB unit may exchange packets that include the message type information illustrated in FIG. 4. For example, to request setting/status information from the STB unit, the AP unit may transmit, to the STB unit, a message with the message type "GET_AP_STB_DATA_REQ". Then, in response to this message, the STB unit may transmit a message with the message type "NOTIFY_STB_AP_DATA".

According to the present disclosure, it is possible optimize the communication between internal components of the integrated terminal device through easy request for or transmission of setting/status information in the form of message type information by the AP unit and the STB unit even if the messages differ in content.

FIG. 7A to FIG. 7C are example depictions to explain request parameters of the data in the packet transmitted by the AP unit and the STB unit in the integrated terminal device in accordance with an embodiment of the present disclosure.

Herein, "UE" may refer to user equipment information and represent components of the AP unit and STB unit as sub-components of the UE. "UE:Model" may refer to a model name of the integrated terminal device. "UE:Binary" may refer to a binary version of each of the AP unit and the STB unit depending on the message type information described above with reference to FIG. 6. Particularly, this request parameter represents the firmware binary for the AP unit in the STB unit. "UE:MAC" may refer to a MAC address of each of the AP unit and the STB unit. "UE:MsgId" may correspond to an ID used to differentiate a message in a data portion of a packet in the form of JSON, and may be set randomly based on the current time. "UE:Status" may represent current status information of each of the AP unit and the STB unit, which will be described with reference to FIG. 7A to FIG. 7C.

The values beginning with "AP" and corresponding to the user equipment information UE may refer to AP information. More specifically, "AP:FactoryMode" may indicate whether the AP unit is set to Factory Mode for mass production and includes setting values for mass production. "AP:SetButton" may include information for connection to the STB unit by pressing a Wi-Fi Protected Setup (WPS) button of a Push Button Configuration (PBC) applied to the AP unit or for initializing the settings of or the AP unit by pressing an RST (Reset) button. "AP:NetworkType" may include information constituting a bridge mode to perform Network Address Translation (NAT) of the AP unit or assign a public IP to the AP unit. "AP:IPType" may include information for configuring IP settings of the AP unit with the DHCP or a static IP address. "AP:IPAddress", "AP:Subnetmask", "AP:Gateway", "AP:PrimaryDNS", and "AP:SecondaryDNS" may represent parameters for IP settings of the AP unit. "AP:WiFi" may include information for configuring Wi-Fi settings of the AP unit.

"AP:WiFi:Frequency" may include information for setting frequencies (e.g., 2.4 GHz, 5 GHz, 6 GHz) used by the AP unit, and "AP:WiFi:Activation" may include information for setting whether to activate or deactivate the frequencies used by the AP unit. "AP:WiFi:Technology" may include information for setting Wi-Fi technology used by the AP unit. For example, 802.11a, 802.11n, 802.11ac, or 802.11ax, may be applied individually or collectively. "AP:WiFi:ChannelBand" may include information for setting bandwidths (e.g., 160 MHz) of Wi-Fi channel used by the AP unit. "AP:WiFi:ChannelMode" may include information for determining whether to assign a Wi-Fi channel list automatically, to select a specific channel and assign the selected channel automatically, or to set manually. "AP:WiFi:Channel" may include information for selecting a specific Wi-Fi channel used by the AP unit. "AP:WiFi:TxPower" may include information for setting power values of Wi-Fi channels used by the AP unit. "AP:WiFi:SSIDType" may include information for selecting a frequency (e.g., 2.4 GHz, 5 GHz, 6 GHz) for SSID (wireless LAN name) used by the AP unit. "AP:WiFi:SSIDActivation" may include information for determining whether to transmit the wireless LAN name by activation or inactivation to use SSID (wireless LAN name). "AP:WiFi:SSID" may represent SSID (wireless LAN name) transmitted by the AP unit.

"AP:WiFi:Password" may represent a password used for SSID (wireless LAN name) transmitted by the AP unit. "AP:WiFi:Security" may represent a Wi-Fi security mode used by the AP unit, and it may represent, for example, "WPA-PSK" if WPA-PSK is used for SSID (wireless LAN name). "AP:WiFi:WPAMode" may include information for selecting one (e.g., WPA3-PSK) of WPA-PSK security modes used in the Wi-Fi of the AP unit. "AP:WiFi:EncType" refers to security data encryption methods, such as TKIP or AES, used with WPA-PSK. "AP:WiFi:EasyMesh" may include information for determining whether to connect an agent of the AP unit in the form of a repeater as a sub-device of the AP unit.

The request parameters of the data in the packet transmitted by the AP unit and the STB unit in the integrated terminal device have been described above. However, additional request parameters may be added to the above-described request parameters or some of the above-described request parameters may be modified or removed depending on the functions and performance of the integrated terminal device.

FIG. 8 is an example depiction to explain a format of a request message transmitted by the AP unit and the STB unit in the integrated terminal device in accordance with an embodiment of the present disclosure.

It can be seen from FIG. 8 that a header (Head) of a packet constituting a request message defines a name of the integrated terminal device as "S-Box", uses version 0x01, and specifies token information with 16 digits and a data size of 2 bytes for encryption and decryption.

Meanwhile, it can be seen that a data portion (JSON Data) of the packet includes user equipment information (UE) and AP information (AP). Herein, the user equipment information (UE) includes details, such as a model name "MK206S" (UE:Model), a binary version "1.0.0" (UE:Binary), and a MAC address "AA:BB:CC:DD:EE:FF" (UE:MAC).

Also, the user equipment information refers to a request message of the AP unit to get data from the STB unit, and includes message type information "GET_AP_STB_DATA_REQ" (UE:MsgType) and message ID information "20211112163117_1234567890ABCDEF" (UE:MsgId). The AP information (AP) may include AP operating mode information "KTMode" (AP:NetworkType), information (AP:IPType) for setting a predetermined IP "StaticiP", an IP address "10.1.1.12" (AP:IPAddress), a subnet mask address "255.255.255.0" (AP:Subnetmask), and a gateway address "10.1.1.1" (AP:Gateway).

Furthermore, the information for configuring Wi-Fi settings of the AP unit (AP:WiFi) may include information indicating that a frequency band is 2G (AP:WiFi:Frequency) and information indicating that a 2G frequency domain is not activated (AP:WiFi:activation). Moreover, the information for configuring Wi-Fi settings of the AP unit (AP:WiFi) may include information indicating that a frequency band is 5G (AP:WiFi:Frequency), information indicating that "a/n/ac/ax" Wi-Fi is used (AP:WiFi:Technology), information indicating that a channel bandwidth is 80 MHz (AP:WiFi:ChannelBand), information indicating that a channel mode is "Static" (AP:WiFi:ChannelMode), information for setting 36 and 48 as channels used by the AP unit (AP:WiFi:Channel), information indicating that SSID type of the AP unit is Mesh (AP:WiFi:SSIDType), SSID information transmitted by the AP unit (AP:WiFi:SSID), information indicating that a password used for SSID is 12345678 (AP:WiFi:Password), and information indicating that a Wi-Fi security method used by the AP unit is not determined (AP:WiFi:Security).

FIG. 9A to FIG. 9C are example depictions to explain response parameters of the data in the packet transmitted by the AP unit and the STB unit in the integrated terminal device in accordance with an embodiment of the present disclosure. Hereafter, explanation about the same parts as the request parameters of FIG. 7A to FIG. 7C will be omitted from the description about response parameters of FIG. 9A to FIG. 9C.

Among the response parameters, "Code" represents a response result code, and a code satisfying predetermined conditions may be used. "Message" may refer to a text message displayed on the screen at the same time as transmission of a response message. When JSON value setting fails, the related failure parameter may be displayed.

"UE:Status" represents current status information of each of the AP unit and the STB unit, which has been described with reference to FIG. 7A to FIG. 7C.

"UE:StatusTime" refers to a setting standby time for the AP unit and may be displayed in a progress bar on the STB unit. UE:StatusTime may be set to 0 seconds, which implies that it is applied immediately without any standby time. "AP:WiFi:ScanResultRSSI" represents a Received Signal Strength Indicator (RSSI) value derived from a result of scanning Wi-Fi signals of the AP unit.

FIG. 10 is an example depiction to explain response codes of the data in the packet transmitted by the AP unit and the STB unit in the integrated terminal device in accordance with an embodiment of the present disclosure.

Each response code may be selected according to predetermined conditions in response to a request message received by the AP unit or the STB unit and may be included in a response message. For example, if the request message is successfully processed, a response code 200 may be included in the response message, and if Wi-Fi settings are in progress and a response cannot be provided, a response code 401 may be included in the response message. Further, if a token information error occurs, a response code 400 may be included in the response message. More specific response codes based on conditions are shown in FIG. 10.

FIG. 11 is an example depiction to explain a format of a response message transmitted by the AP unit and the STB unit in the integrated terminal device in accordance with an embodiment of the present disclosure.

It can be seen from FIG. 11 that a header (Head) of a packet constituting a response message defines a name of the integrated terminal device as "S-Box," uses version 0x01, and specifies token information with 16 digits and a data size of 2 bytes for encryption and decryption.

Meanwhile, it can be seen that a data portion (JSON Data) of the packet includes user equipment information (UE). Herein, the user equipment information (UE) includes details, such as a model name "MK206S" (UE:Model), a binary version "1.0.0" (UE:Binary), and a MAC address "AA:BB:CC:DD:EE:FF" (UE:MAC).

Also, the user equipment information refers to a message of the STB unit to notify the AP unit in response to a request, and includes message type information "NOTIFY_STB_AP_DATA" (UE:MsgType) and message ID information "20211112163117_1234567890ABCDEF" (UE:MsgId). The user equipment information also includes information indicating that the status is "OK" (UE:Status) and information indicating that a status setting standby time is 30 seconds (UE:StatusTime).

Figure 12:
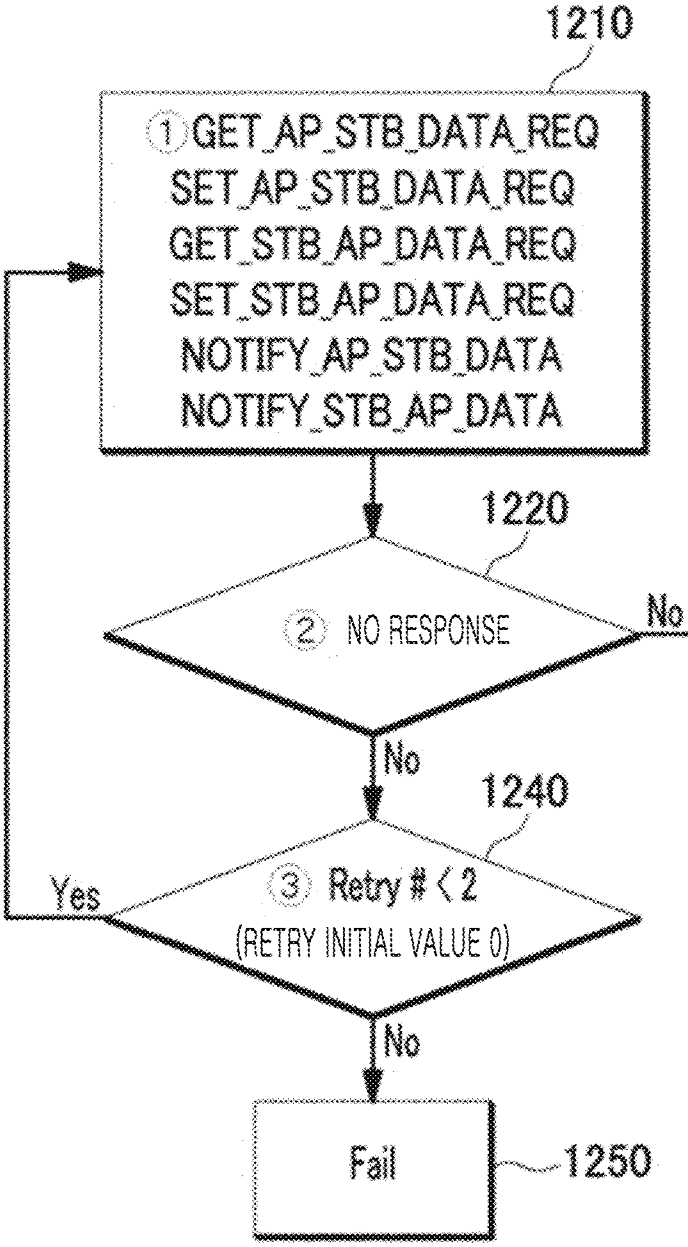
FIG. 12 and FIG. 13 are flowcharts to explain cases where no response or a specific response code is generated with respect to the request message transmitted by the AP unit and the STB unit in the integrated terminal device in accordance with an embodiment of the present disclosure.
Figure 13:
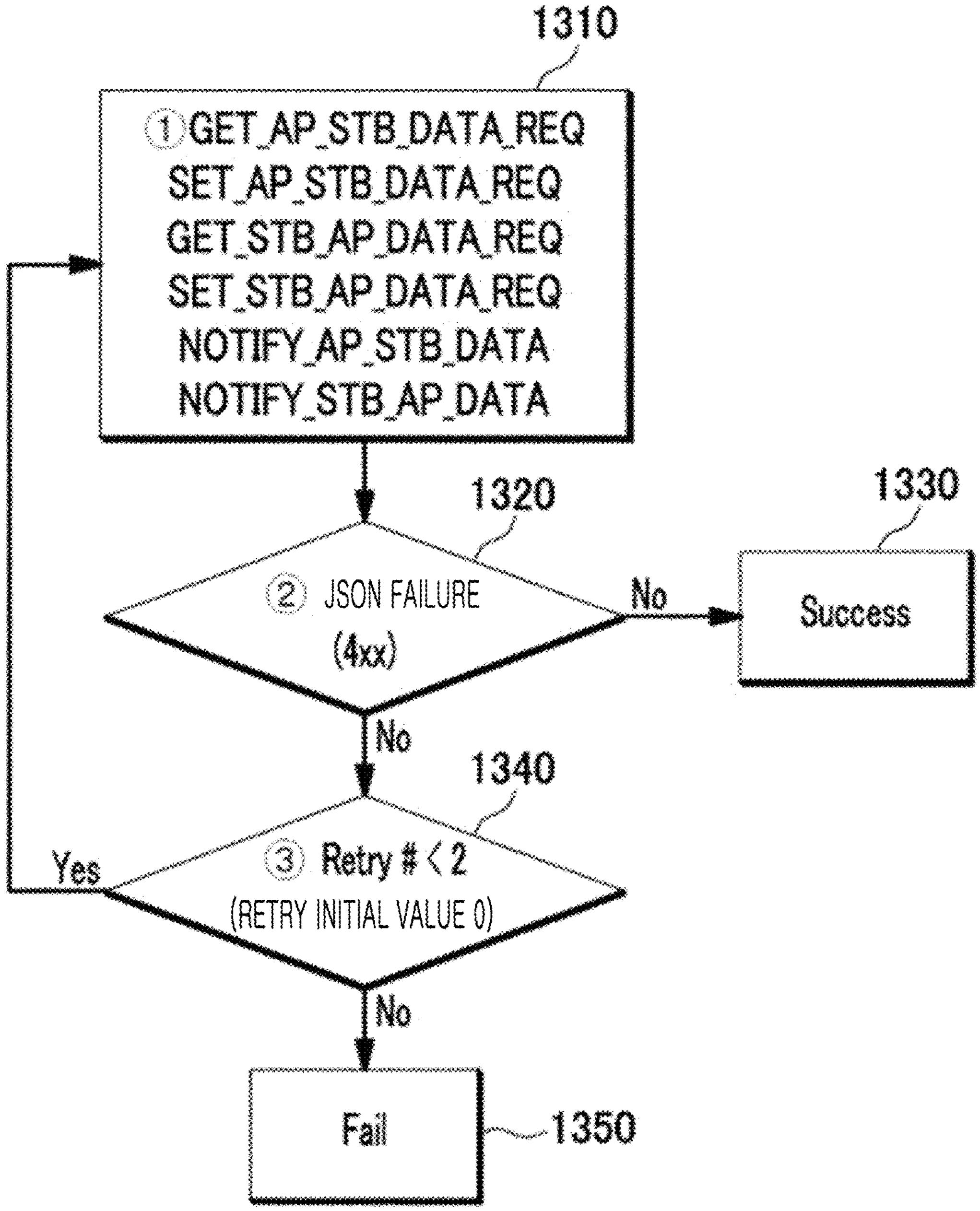

FIG. 12 and FIG. 13 are flowcharts to explain cases where no response or a specific response code is generated with respect to the request message transmitted by the AP unit and the STB unit in the integrated terminal device in accordance with an embodiment of the present disclosure.

Referring to FIG. 12, when one of the STB unit and the AP unit transmits a message with message type information (1210), it waits for a response message from the other device (1220). When it receives a response message within a predetermined period of time, communication is considered successful (1230). However, when there is no response from the other device, the AP unit or the STB unit checks whether it has retransmitted the message transmitted in the process 1210. When the number of retransmission (RETRY #) is less than 2, it retransmits the message transmitted in the process 1210 to the other device and increments the number of retransmission by 1 (1240). When retransmission has already occurred twice and the number of retransmission is 2 or more, message transmission is considered failed (1250) and retransmission is ended.

Referring to FIG. 13, when one of the STB unit and the AP unit transmits a message with message type information (1310) and receives a normal response message with the response code 200 in response to the request message from the other device (1320), communication is considered successful (1330). However, when it receives a response message with a 400$^{th}$ response code from the other device, the AP unit or the STB unit checks whether it has retransmitted the message transmitted in the process 1310. When the number of retransmission (RETRY #) is less than 2, it retransmits the message transmitted in the process 1310 to the other device and increments the number of retransmission by 1 (1340). When retransmission has already occurred twice and the number of retransmission is 2 or more, message transmission is considered failed (1350) and retransmission is ended.

When the AP unit transmits a message to the STB unit or the STB unit transmits a message to the AP unit, the integrated terminal device controls the AP unit or the STB unit to retransmit the message if there is no response or a specific response code occurs. Thus, it is possible to suppress the occurrence of message transmission failures caused by temporary errors.

Figure 14:
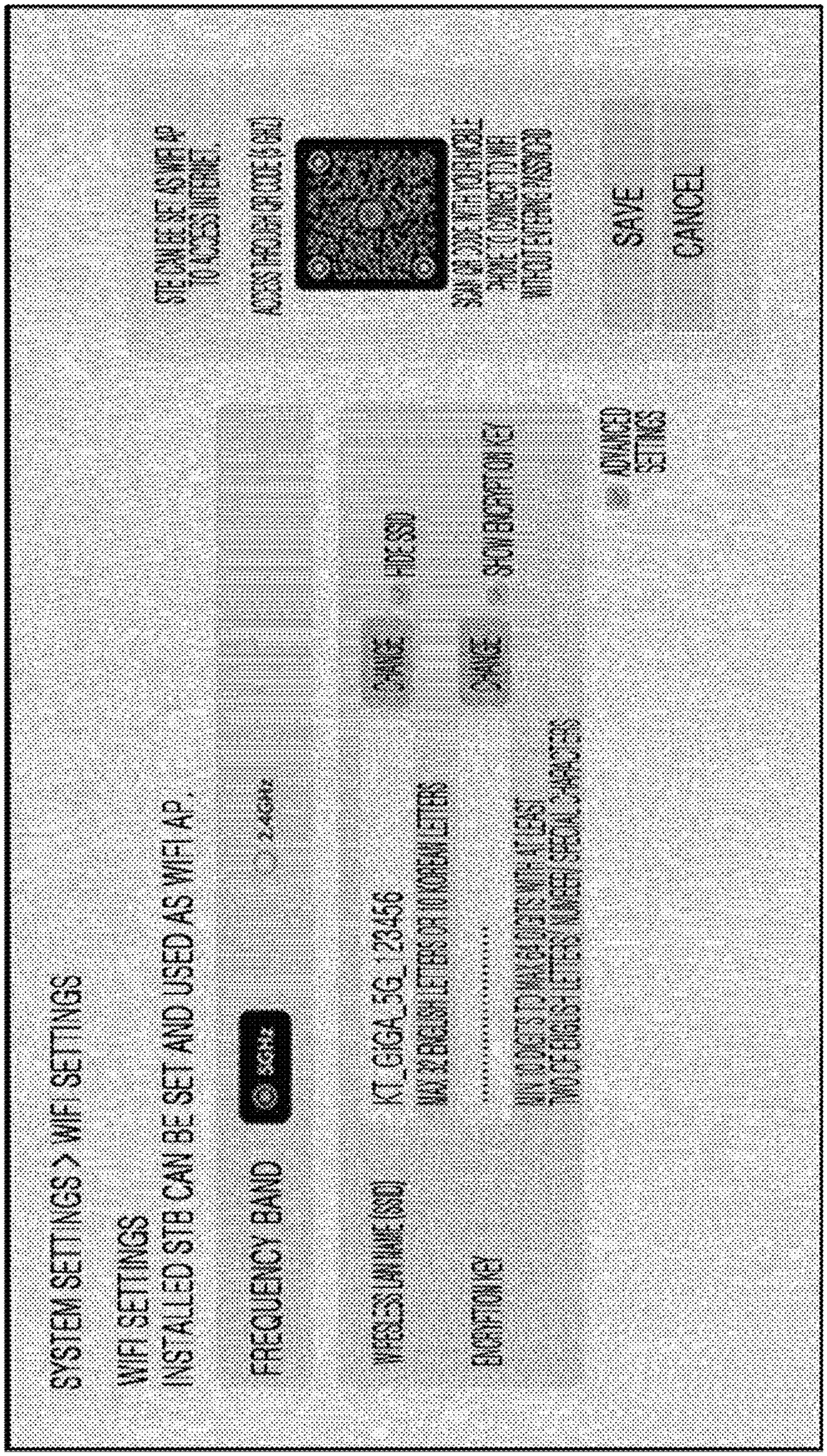
FIG. 14 to FIG. 16 are example depictions to explain a control interface of the AP unit displayed through the STB unit in the integrated terminal device in accordance with an embodiment of the present disclosure.
Figure 15:
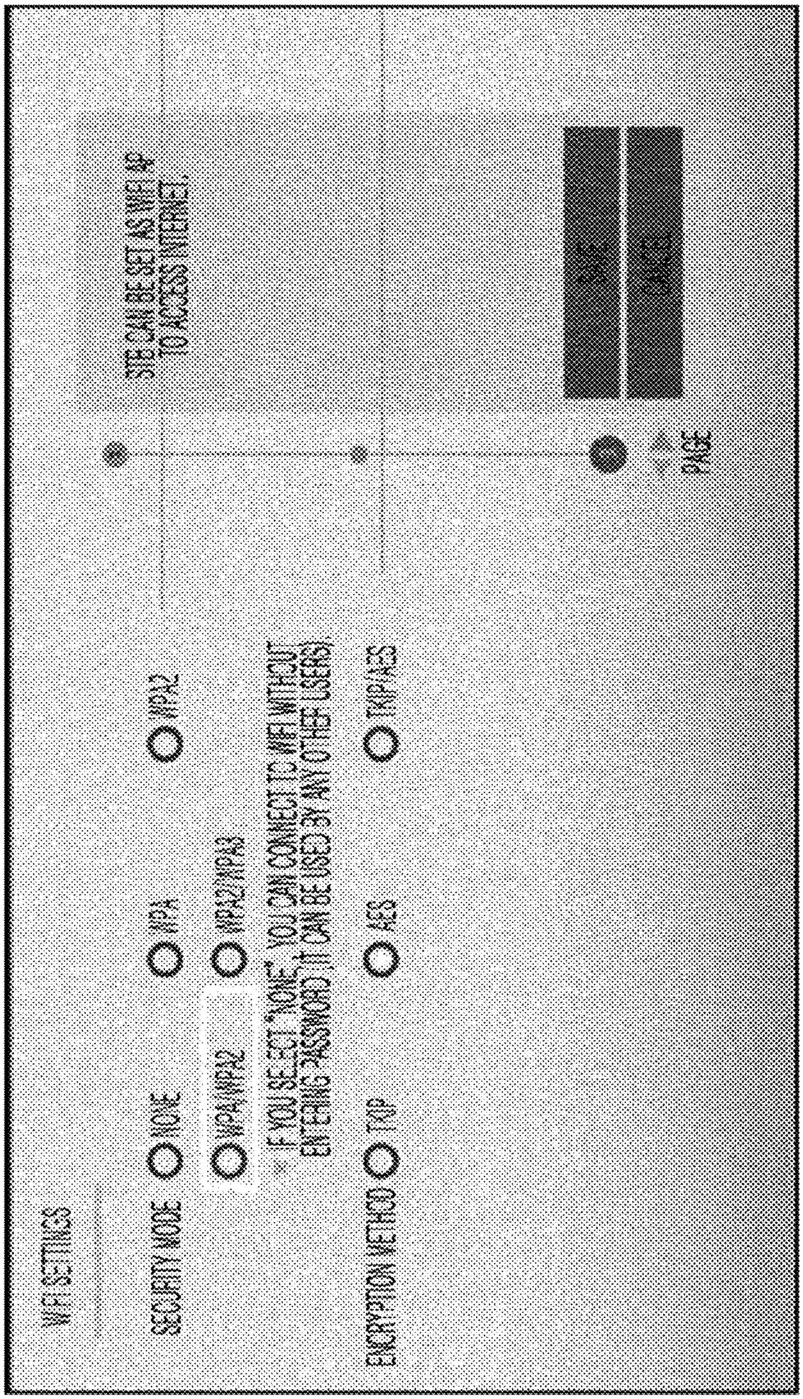
Figure 16:
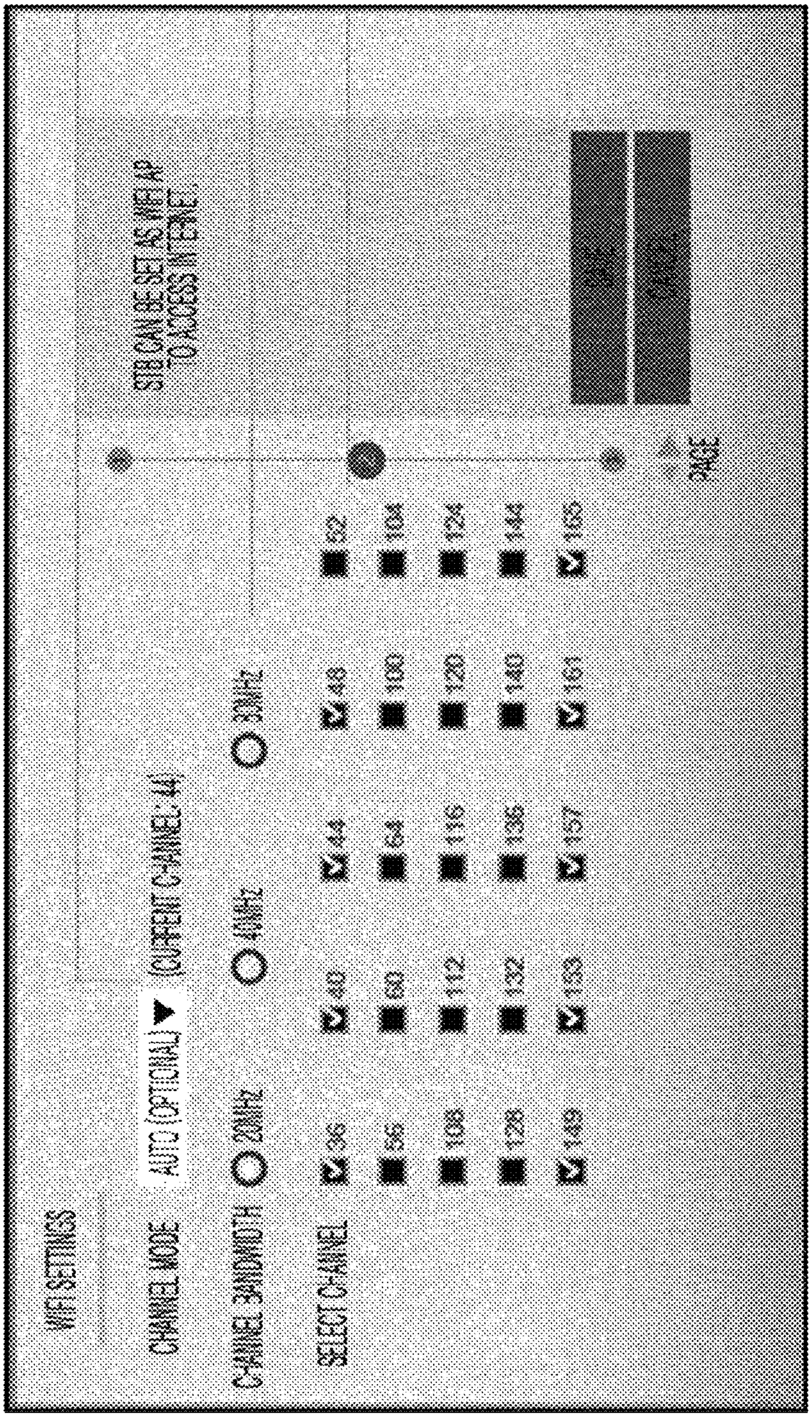

FIG. 14 to FIG. 16 are example depictions to explain a control interface of the AP unit displayed through the STB unit in the integrated terminal device in accordance with an embodiment of the present disclosure.

FIG. 14 to FIG. 16 illustrate examples of a user interface screen for controlling the settings of the AP unit through the STB unit. In the examples shown in FIG. 14 to FIG. 16, a user viewing a TV through the STB unit directly controls the AP unit as needed. The integrated terminal device according to an embodiment of the present disclosure can change the settings of the AP unit in the STB unit and thus control the AP unit directly through the TV being viewed without the need for a separate device.

More specifically, FIG. 14 illustrates an example of a Wi-Fi setting screen on a setting interface of the AP unit through the STB unit. On the screen in FIG. 14, the user can select 5 GHz or 2.4 GHz as a Wi-Fi frequency band of the AP unit, and if 5 GHz and 2.4 GHz are individually selected, a wireless LAN name (SSID) and a password can be changed.

In FIG. 14, the wireless LAN name (SSID) can be set up to 32 bytes according to the 802.11 standard. Further, the SSID can be input in UTF-8 to support Korean letters. When Korean letters are input, UTF-8 encoding consists of 3 bytes and thus is configured to allow input of up to 10 digits. The SSID may have a hidden SSID function to hide the SSID from visibility and provide a checkbox to select this function. An encryption key can be input with 10 to 64 digits according to a predetermined Wi-Fi standard, and the encryption key may initially be masked. Meanwhile, the masking may be disabled to allow the user to type and check the encryption key directly. The encryption key may include a combination of at least two of English letters, numbers, and special characters. When the input of the SSID and the encryption key is completed, a validity check is performed. In normal cases, the changes are displayed, and if an error occurs during the validity check, an error popup appears. The Wi-Fi setting screen may provide a QR code, which enables the settings of the AP unit to be changed on a smartphone by accessing the QR code with the smartphone.

FIG. 15 illustrates another example of the Wi-Fi setting screen on the setting interface of the AP unit through the STB unit. On the screen in FIG. 15, the user can set a security mode and an encryption method in the advanced settings of the AP unit.

In FIG. 15, the security mode setting menu of the AP unit offers options, such as None, WPA, WPA2, WPA3, WPA/WPA2, and WPA2/WPA3. For the integrated terminal device, WPA/WPA3 may be set as an initial value. Also, the encryption method menu offers options, such as TKIP, AES, and TKIP/AES. For the integrated terminal device, AES may be set as an initial value. Herein, when WPA3 or WPA2/WPA3 is selected as a security mode, only AES is activated, and TKIP or TKIP/AES cannot be selected.

FIG. 16 illustrates yet another example of the Wi-Fi setting screen on the setting interface of the AP unit through the STB unit. On the screen in FIG. 16, the user can set a channel mode, a channel bandwidth, and a channel selection in the advanced settings of the AP unit.

In FIG. 16, the channel mode menu offers options to select one of Auto, Auto (optional), and Manual. Channel setting values that can be suggested when a channel bandwidth is 2.4 GHz or 5 GHz will be described below with reference to FIG. 17A and FIG. 17B.

FIG. 17A and FIG. 17B are example depictions to explain channel values that can be set depending on the frequency band or channel mode when the AP unit is controlled through the STB unit in the integrated terminal device in accordance with an embodiment of the present disclosure.

More specifically, FIG. 17A is a diagram illustrating the types of channels available for selection depending on the selected channel mode and channel bandwidth when the AP unit uses a bandwidth of 2.4 GHz on the setting interface screen of the AP unit in FIG. 16. FIG. 17B is a diagram illustrating the types of channels available for selection depending on the selected channel mode and channel bandwidth when the AP unit uses a bandwidth of 5 GHz on the setting interface screen of the AP unit in FIG. 16.

Figure 18:
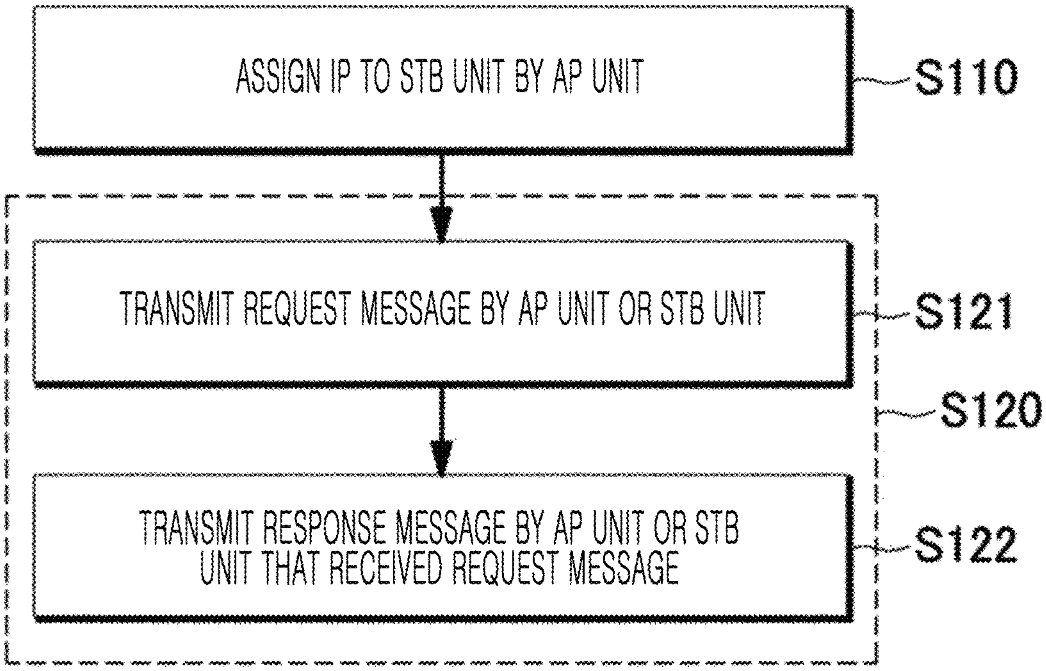
FIG. 18 is a flowchart to explain a control method of the integrated terminal device in accordance with an embodiment of the present disclosure.

FIG. 18 is a flowchart to explain a control method of the integrated terminal device in accordance with an embodiment of the present disclosure.

Referring to FIG. 18, the control method of the integrated terminal device may include a process of assigning an IP to the STB unit by the AP unit (S110), a process of transmitting a request message by the AP unit or the STB unit (S121), and a process of transmitting a response message by the AP unit or the STB unit that received the request message (S122).

In the process S110 of assigning an IP to the STB unit by the AP unit, the AP unit initiates a home network communication with the STB unit through a Dynamic Host Configuration Protocol (DHCP) and assigns an Internet protocol (IP) address to the STB unit.

The process S121 of transmitting a request message by the AP unit or the STB unit and the process S122 of transmitting a response message by the AP unit or the STB unit that received the request message may be included in a process of transmitting and receiving packets by the AP unit and the STB unit to and from each other through an inter-process communication (IPC) (S120).

The control method of the integrated terminal device according to an embodiment of the present disclosure may further include a process of transmitting an Address Resolution Protocol (ARP) request by the STB unit through an IP address of the AP unit.

The integrated terminal device according to an embodiment of the present disclosure may further include an AI speaker unit that recognizes voice input from the outside and outputs a processing result through a speaker. The STB unit is connected to the AI speaker unit and can control the AP unit based on a user command input through an AI CPU.

In the control method of the integrated terminal device according to an embodiment of the present disclosure, the packets transmitted between the AP unit and the STB unit may be in the form of JavaScript Object Notation (JSON). Each packet in the form of JSON may include a header including at least one of information on a name of the integrated terminal device, information on a version of a protocol configured in the integrated terminal device, and token information for data encryption during communication between the AP unit and the STB unit.

Herein, the token information can be generated randomly, computed along with symmetric keys delivered to both the transmission and reception sides of the packet, and used for data encryption.

Further, the packet in the form of JSON may further include a data portion transmitted along with the header data. The data portion may include at least one of user equipment information including request parameters to retrieve or control information of the user equipment and AP information including request parameters to retrieve or control information of the AP unit. The user equipment information may be information for controlling the integrated terminal device including the AP unit and the STB unit.

The user equipment information includes message type information included in the packet and configured to define a type of message. The message type information may refer to information configured to define at least one of a type of a request of the AP unit to get data from the STB unit, a type of a request of the AP unit to set data from the STB unit, a type of a response of the AP unit to the request of the STB unit, a type of a request of the STB unit to get data from the AP unit, a type of a request of the STB unit to set data from the AP unit, and a type of a response of the STB unit to the request of the AP unit.

Herein, the data portion further includes response code information to classify whether data transmission between the AP unit and the STB unit succeeded or failed. The integrated terminal device may perform retransmission in a situation corresponding to response code information indicative of data transmission failure.

Figure 19:
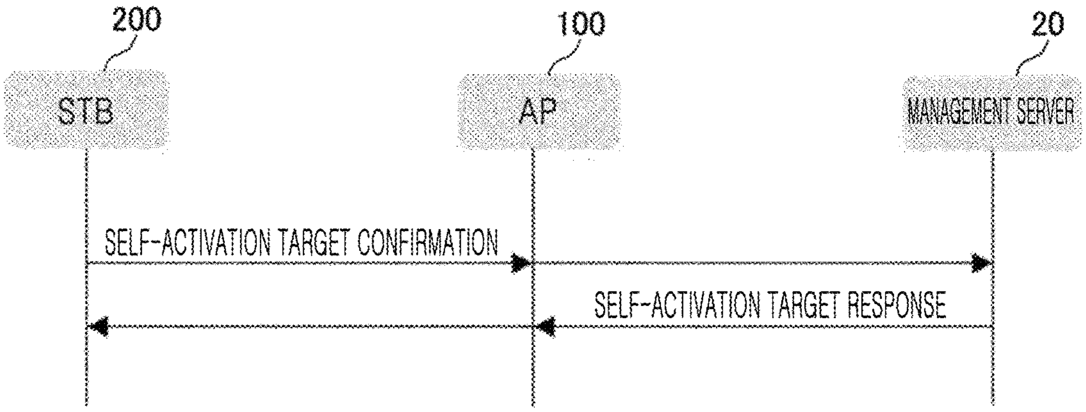
FIG. 19 to FIG. 21 are example depictions to explain a process of performing activation by the STB unit in accordance with an embodiment of the present disclosure.
Figure 20:
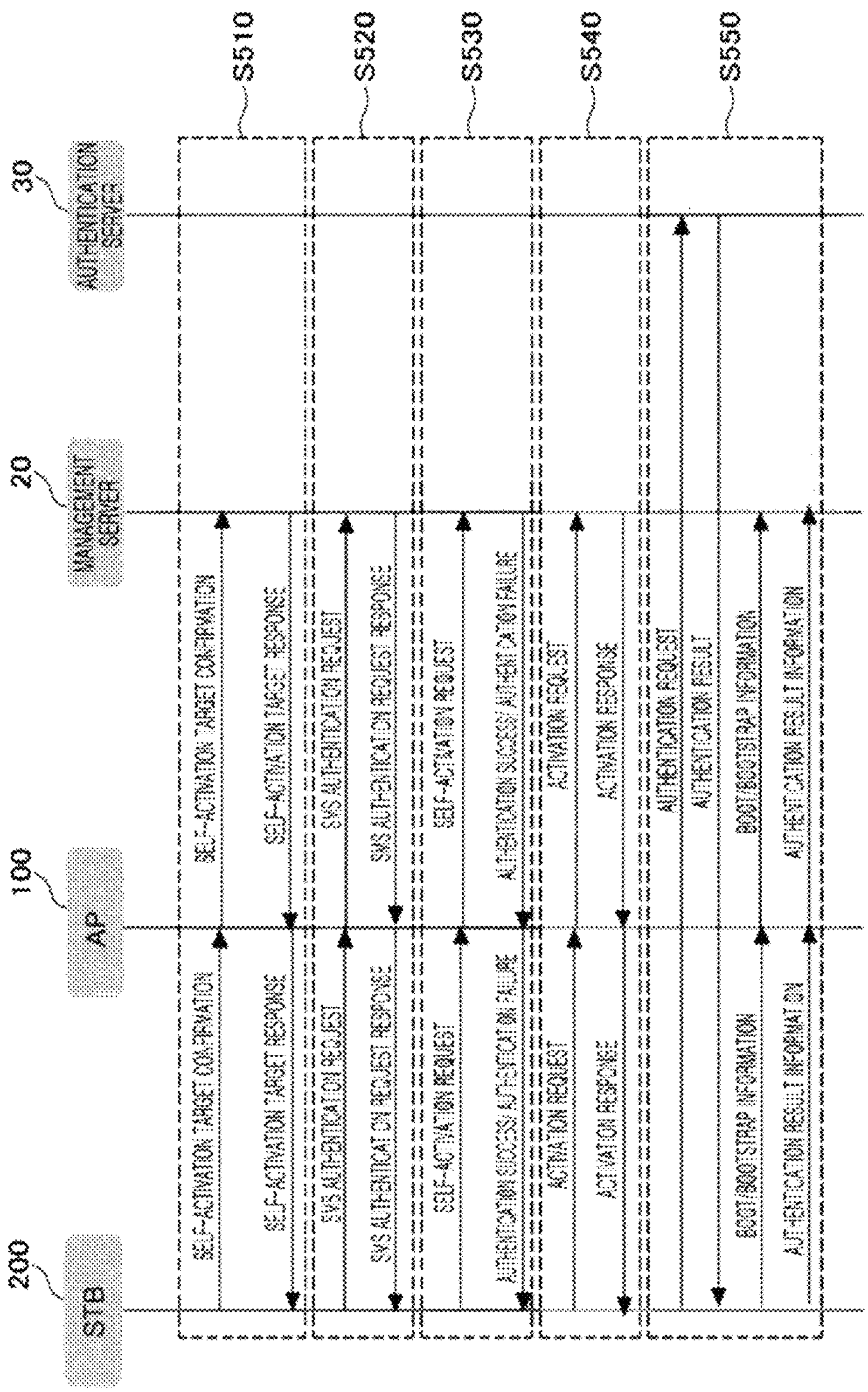
Figure 21:
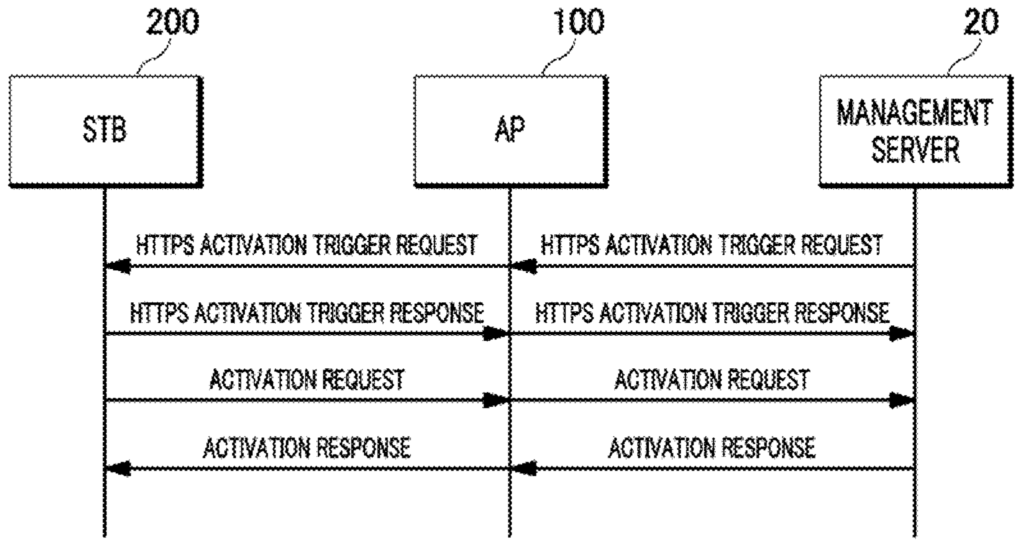

FIG. 19 to FIG. 21 are example depictions to explain a process of performing activation by the STB unit in accordance with an embodiment of the present disclosure.

Referring to FIG. 19, the AP unit 100 may serve as a medium that transfers messages from the STB unit 200 to a management server 20 during activation of the STB unit 200. More specifically, the AP unit 100 may transfer a message provided from the STB 200 to the management server 20 through Network Address Translation (NAT) and also transfer a message provided from the management server 20 to the STB unit 200. Herein, the management server 20 may refer to a management server for terminals that use TR-069. In this case, the AP unit and the STB unit may be linked to the management server through a predetermined URL (e.g., "https://box.xxcems.com/device/tr-069").

Referring to FIG. 19, when the STB unit 200 transmits self-activation target confirmation information to the AP unit 100, the AP unit 100 may transmit the self-activation target confirmation information to the management server 20. Then, the management server 20 generates self-activation target response information and transmits it to the AP unit 100, and the AP unit 100 may provide the STB unit 200 with the self-activation target response information received from the management server 20.

Referring to FIG. 20, an example of self-activation for the STB unit 200 will be described in more detail. Herein, the self-activation may refer to a process in which the user activates the STB unit 200 independently without the need for an Internet service provider (ISP) or a telecom technician.

Referring to FIG. 20, the self-activation for the STB unit 200 may include a self-activation target confirmation process S510, a self-activation attempt stage S520, an authentication process S530, an activation process S540, and a boot process S550.

In the self-activation target confirmation process S510, the STB unit 200 transmits self-activation target confirmation request information to the management server 20 through the AP unit 100, and if the STB unit 200 is included in a self-activation target, the management server 20 generates self-activation target response information and transmits it to the STB unit 200 through the AP unit 100.

In the self-activation attempt stage S520, the STB unit 200 transmits SMS authentication request information to the management server 20 through the AP unit 100, and the management server 20 transmits SMS authentication response information, which includes an authentication number for SMS authentication, to the STB unit 200 through the AP unit 100.

In the authentication process S530, the STB unit 200 transmits self-activation request information including an authentication number to the management server 20 through the AP unit 100, and if the input authentication number is correct, the management server 20 transmits authentication success information, which allows activation, to the STB unit 200 through the AP unit 100 or if the authentication number is incorrect, the management server 20 transmits authentication failure information, which does not allow activation, to the STB unit 200 through the AP unit 100.

In the activation process S540, the STB unit 200 transmits activation request information to the management server 20 through the AP unit 100 and the management server 20 transmits activation response information to the STB unit 200 through the AP unit 100.

In the boot process S550, the STB unit 200 transmits authentication request information to an authentication server 30 through the AP unit 100 and the authentication server 30 transmits authentication result information to the STB unit 200 through the AP unit 100. The boot process S550 may also include a process in which the STB unit 200 transmits boot or bootstrap information to the management server 20 through the AP unit 100 and the management server 20 checks the boot or bootstrap information and transmits authentication result information to the STB unit 200 through the AP unit 100.

Referring to FIG. 21, an example of HTTPS triggering activation for the STB unit 200 will be described in more detail. Herein, the HTTPS triggering activation may refer to a process in which the ISP or telecom provider of the STB unit 200 directly accesses the STB unit 200 to initiate activation.

Referring to FIG. 21, the HTTPS triggering activation may include a process in which the management server 20 transmits HTTPS activation trigger request information to the STB unit 200 through the AP unit 100 and the STB unit 200 transmits HTTPS activation trigger response information to the management server 20 through the AP unit 100. Further, the HTTPS triggering activation may include a process in which the STB unit 200 transmits activation request information to the management server 20 through the AP unit 100 and the management server 20 transmits activation response information to the STB unit 200 through the AP unit 100.

In the self-activation process shown in FIG. 20 and the HTTPS triggering activation process shown in FIG. 21, the messages transmitted from the AP unit 100 or the STB unit to the management server 20 may include Product Class and MAC address. To inform the management server 20 that the STB unit 200 is a sub-device of the AP unit 100, the STB unit 200 may transmit a message including MAC address of the AP unit 100. When the management server 20 attempts to control the AP unit 100 and the STB unit 200 by UDP Hole Punching, the management server 20 may operate separately in ProductClass and SubProductClass which are types of device management services. Accordingly, the integrated terminal device 10 can recognize the AP unit 100 based on ProductClass and the STB unit 200 based on SubProductClass. Also, the management server 20 can control the AP unit 100 and the STB unit 200 as a single integrated terminal device.

Figure 22:
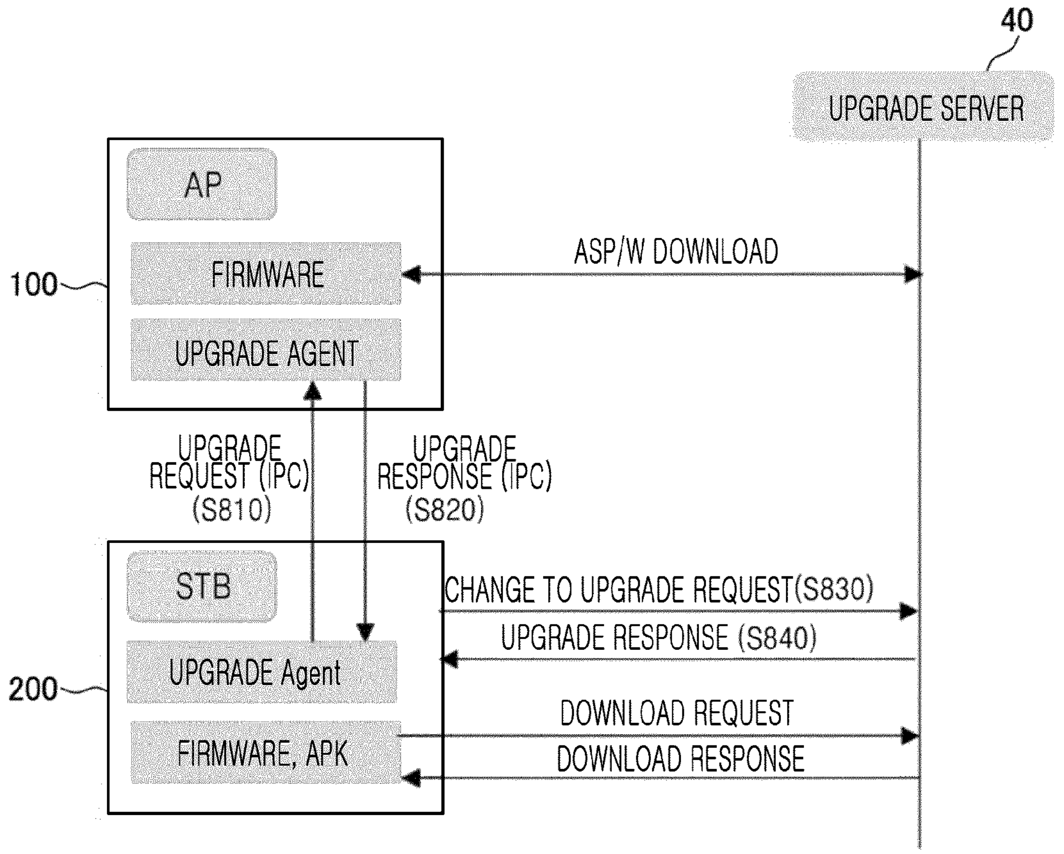
FIG. 22 and FIG. 23 are example depictions to explain a process of performing firmware upgrade by the STB unit in accordance with an embodiment of the present disclosure.
Figure 23:
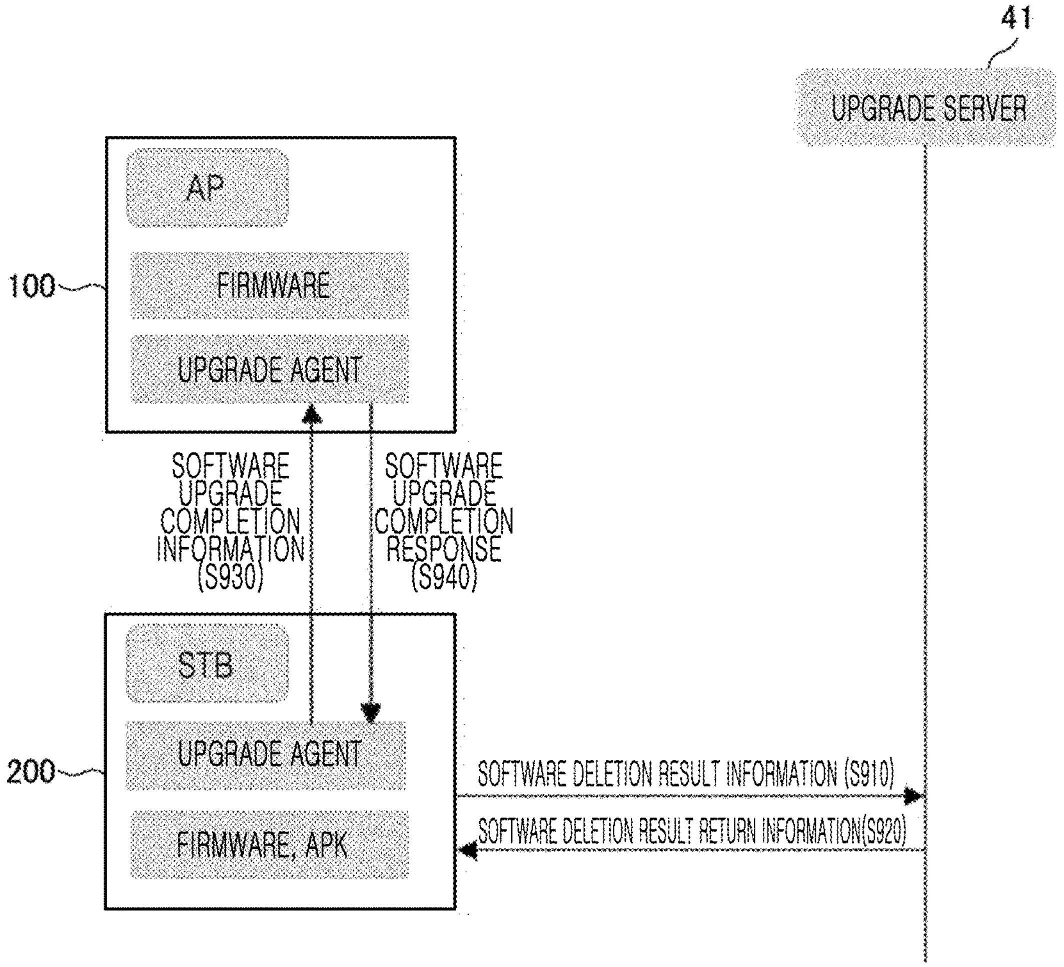

FIG. 22 and FIG. 23 are example depictions to explain a process of performing firmware upgrade by the STB unit in accordance with an embodiment of the present disclosure.

Referring to FIG. 22, the process of performing firmware upgrade by the STB unit 200 may include: a process of transmitting software upgrade request information to the AP unit 100 by the STB unit 200 (S810); if it is determined that the STB unit 200 is in an appropriate state for firmware upgrade, a process of transmitting upgrade response information to the AP unit 100 by the STB unit 200 in response to the software upgrade request information (S820); a process of transmitting the software upgrade request information to an upgrade server 40 by the STB unit 200 (S830); if it is determined that the STB unit 200 is in an available state for software download for upgrade purpose, a process of transmitting software upgrade response information to the STB unit 200 by the upgrade server 40 in response to the software upgrade request information (S840); a process of transmitting software download request information to the upgrade server 40 by the STB unit 200 (S850); and a process of transmitting download response information to the STB unit 200 by the upgrade server 40.

Meanwhile, in a process of performing firmware upgrade by the AP unit 100, the AP unit 10 directly communicates with the upgrade server 40 and downloads software necessary for upgrade.

As described above, to upgrade the STB unit 200, the upgrade request information is transmitted to the AP unit 100 and the upgrade response information is received from the AP unit 100. Accordingly, the STB unit 200 ensures Internet connectivity as a sub-device of the AP unit 100, and the upgrade server 40 or the management server 30 links and manages the AP unit 100 and the STB unit 200.

The process of performing firmware upgrade by the STB unit 200 may be completed by performing the processes shown in FIG. 23 subsequent to the processes shown in FIG. 22.

More specifically, referring to FIG. 23, the process of performing firmware upgrade by the STB unit 200 may include: a process of transmitting software deletion result information to an upgrade server 41 by the STB unit 200 to notify the deletion of a pre-upgrade software version (S910); a process of transmitting software deletion result return information to the STB unit 200 by the upgrade server 41 in response to the software deletion result information (S920); a process of transmitting software upgrade completion information to the AP unit 100 by the STB unit 200 (S930); and a process of transmitting upgrade completion response information to the STB unit 200 by the AP unit 100 in response to the software upgrade completion information (S940). Herein, the processes S930 and S940 may be transmitted through an IPC between the AP unit 100 and the STB unit 200.

FIG. 23 illustrates an operation in which whether the upgrade has been completed and a result of deletion of existing software are provided to the management server or the upgrade server 41 when the STB unit 200 completes the upgrade. The AP unit 100 can recognize that the upgrade has been normally completed by the STB unit 200 through the processes S930 and S940.

In another embodiment of the present disclosure, the upgrade server 40 shown in FIG. 22 is configured to store software information for upgrade purpose and transmit a software file stored therein. The upgrade server 41 shown in FIG. 23 is configured to manage software upgrade and check the status of upgrade.

FIG. 24 is an example depiction to explain a format of the request message transmitted by the AP unit and the STB unit in the integrated terminal device in accordance with an embodiment of the present disclosure.

It can be seen from FIG. 24 that a header (Head) of a packet constituting a request message defines a name of the integrated terminal device as "S-Box", uses version 0x01, and specifies token information with 16 digits and a data size of 2 bytes for encryption and decryption.

Further, it can be seen that a data portion (JSON Data) of the packet includes user equipment information (UE). A request message shown in FIG. 24 is an example of a message to transmit upgrade request information for firmware upgrade purpose to the AP unit by the STB unit.

The user equipment information (UE) includes details, such as a model name "MK206S" (UE:Model), a binary version "1.0.0" (UE:Binary), and a MAC address "AA:BB:CC:DD:EE:FF" (UE:MAC).

Also, the user equipment information refers to a message of the STB unit to notify the AP unit of data, and includes message type information "NOTIFY_STB_AP_DATA" (UE:MsgType) and message ID information "20211112163117_1234567890ABCDEF" (UE:MsgId). Further, the user equipment information may include status information (UE:Status) indicating that the user equipment is in an upgrade notification request state.

FIG. 25 is an example depiction to explain a format of the response message transmitted by the AP unit and the STB unit in the integrated terminal device in accordance with an embodiment of the present disclosure.

It can be seen from FIG. 25 that a header (Head) of a packet constituting a response message defines a name of the integrated terminal device as "S-Box," uses version 0x01, and specifies token information with 16 digits and a data size of 2 bytes for encryption and decryption.

Further, it can be seen that a data portion (JSON Data) of the packet includes user equipment information (UE). A response message shown in FIG. 25 is an example of a message structure used when the AP unit, which has received upgrade request information from the STB unit, transmits upgrade response information to the STB unit.

The user equipment information (UE) includes details, such as a model name "MK206S" (UE:Model), a binary version "1.0.0" (UE:Binary), and a MAC address "AA:BB:CC:DD:EE:FF" (UE:MAC).

Also, the user equipment information refers to a message of the STB unit to notify the AP unit in response to a request, and includes message type information "NOTIFY_AP_STB_DATA" (UE:MsgType) and message ID information "20211112163117_1234567890ABCDEF" (UE:MsgId). Further, the user equipment information may include status information (UE:Status) indicating that the status is in "UpgradeNotiRes".

Figure 26:
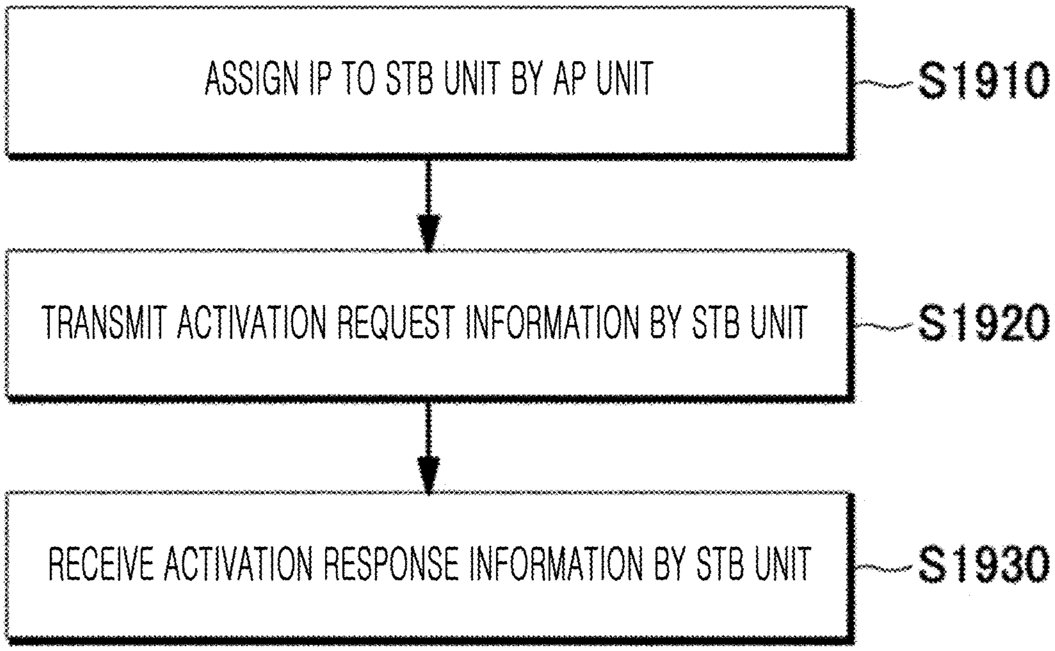
FIG. 26 and FIG. 27 are flowcharts to explain control methods of the integrated terminal device in accordance with an embodiment of the present disclosure.
Figure 27:
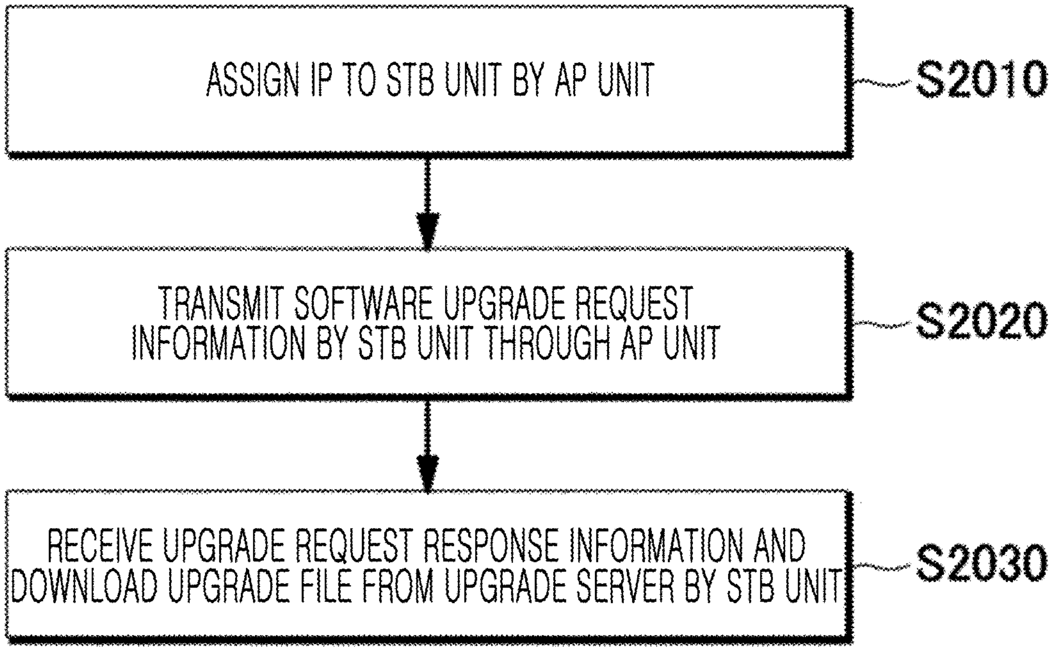

FIG. 26 and FIG. 27 are flowcharts to explain control methods of the integrated terminal device in accordance with an embodiment of the present disclosure.

Referring to FIG. 26, the control method of the integrated terminal device may include: a process of assigning an IP to the STB unit by the AP unit (S1910); a process of transmitting activation request information by the STB unit (S1920); and a process of receiving activation response information by the STB unit (S1930).

In the process S1910 of assigning an IP to the STB unit by the AP unit, the AP unit initiates a home network communication with the STB unit through a Dynamic Host Configuration Protocol (DHCP) and assigns an Internet protocol (IP) address to the STB unit.

Then, in the process S1920 of transmitting activation request information by the STB unit, the STB unit transmits the activation request information to the management server through the AP unit, and in the process S1930 of receiving activation response information by the STB unit, the STB unit receives activation result information transmitted from the management server through the AP unit.

The AP unit may also perform Network Address Translation (NAT) when the STB unit transmits the activation request information and when the STB unit receives the activation response information.

Further, when the user performs self-activation of the STB unit, the STB unit transmits self-activation target confirmation request information to the management server through the AP unit to confirm whether the STB unit is a target for self-activation, receives self-activation target confirmation response information transmitted from the management server through the AP unit, and performs an authentication process with the management server through the AP unit, and upon successful authentication, the STB unit transmits the activation request information through the AP unit and receives the activation response information through the AP unit.

Furthermore, when the management server performs triggering activation, the STB unit receives trigger request information from the management server through the AP unit, transmits trigger response information to the management server through the AP unit, transmits the activation request information to the management server through the AP unit, and receives the activation response information transmitted by the management server through the AP unit.

Referring to FIG. 27, the control method of the integrated terminal device may include a process of assigning an IP to the STB unit by the AP unit (S2010), a process of transmitting software upgrade request information by the STB unit through the AP unit (S2020), and a process of receiving upgrade request response information and downloading an upgrade file from the upgrade server by the STB unit (S2030).

Herein, the control method of the integrated terminal device may further include: after the STB unit downloads the upgrade file, a process of deleting a previous software version; a process of transmitting upgrade completion notification information to the AP unit through an IPC when the upgrade server completes the upgrade; and a process of receiving upgrade completion notification response information from the AP unit to complete the upgrade.

Figure 28:
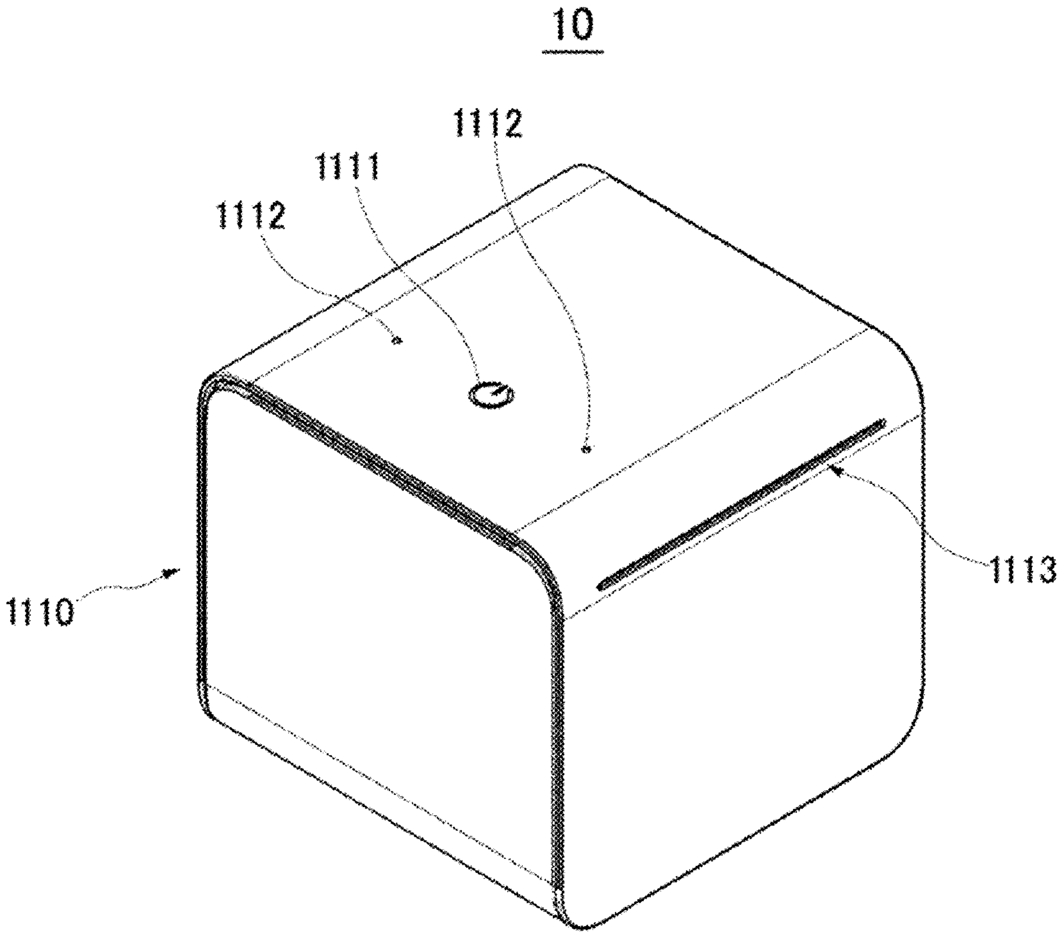
FIG. 28 is a perspective view of the integrated terminal device in accordance with an embodiment of the present disclosure.
Figure 29:
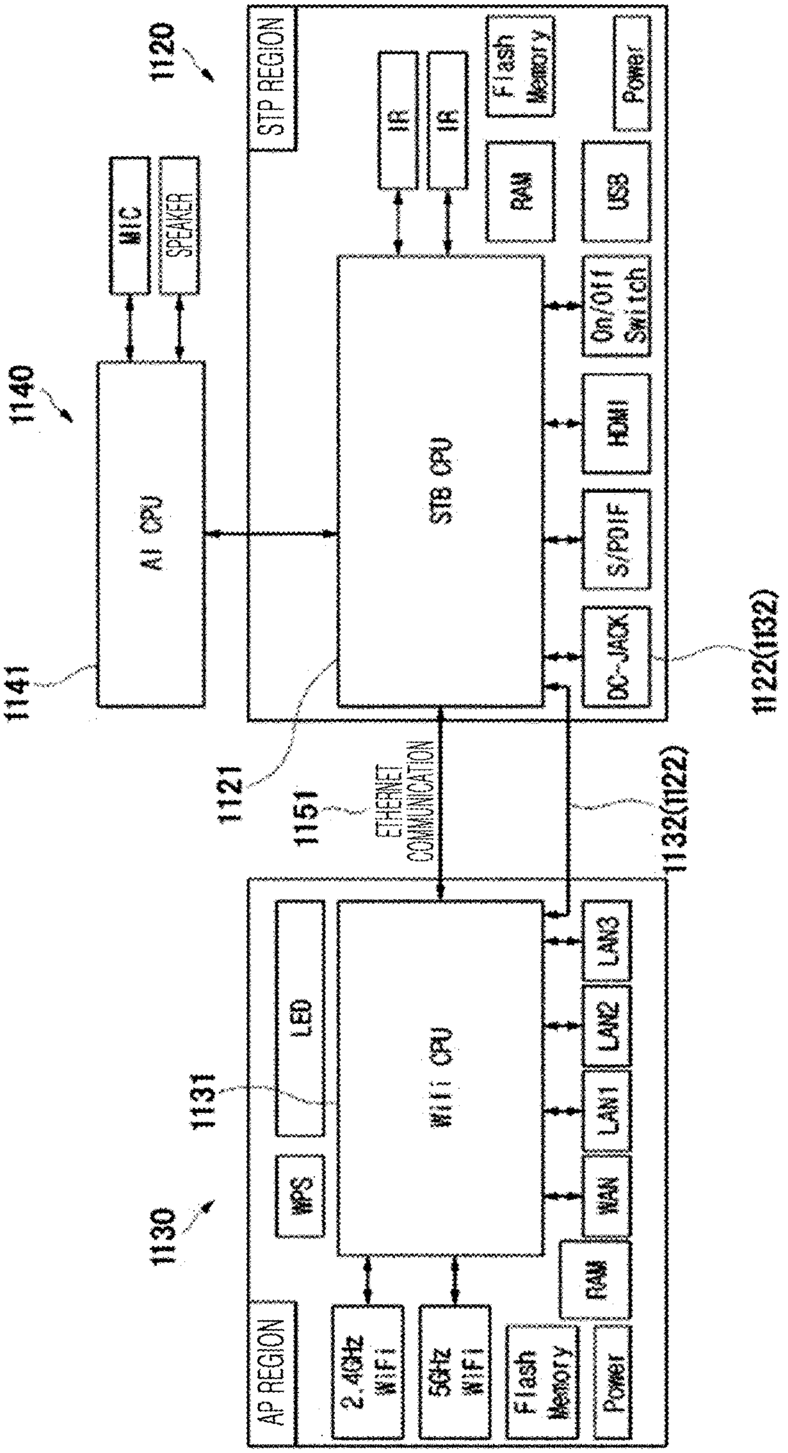
FIG. 29 shows an internal configuration of the integrated terminal device in accordance with embodiments of the present disclosure.
Figure 30:
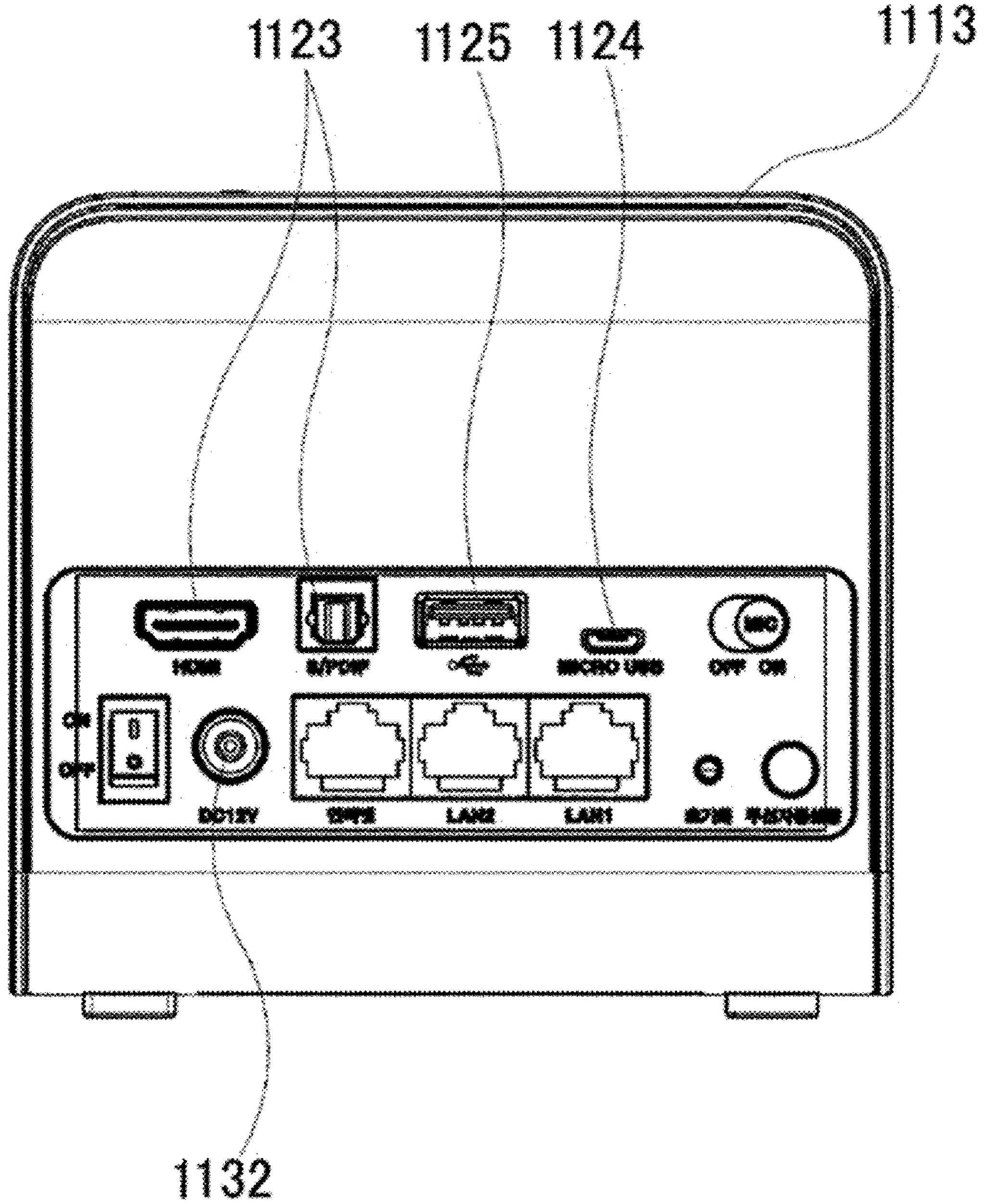
FIG. 30 is a rear view of the integrated terminal device in accordance with an embodiment of the present disclosure.
Figure 31:
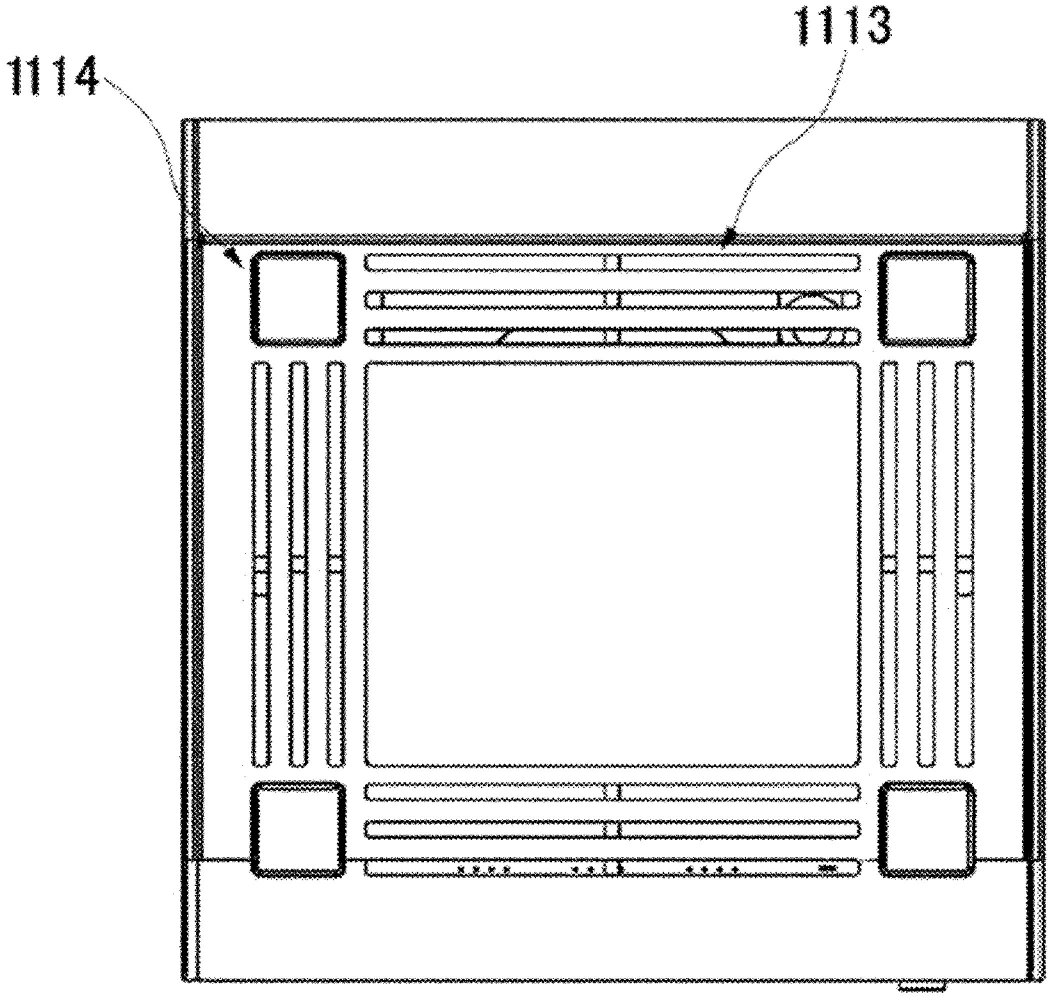
FIG. 31 is a bottom view of the integrated terminal device in accordance with an embodiment of the present disclosure.
Figure 32:
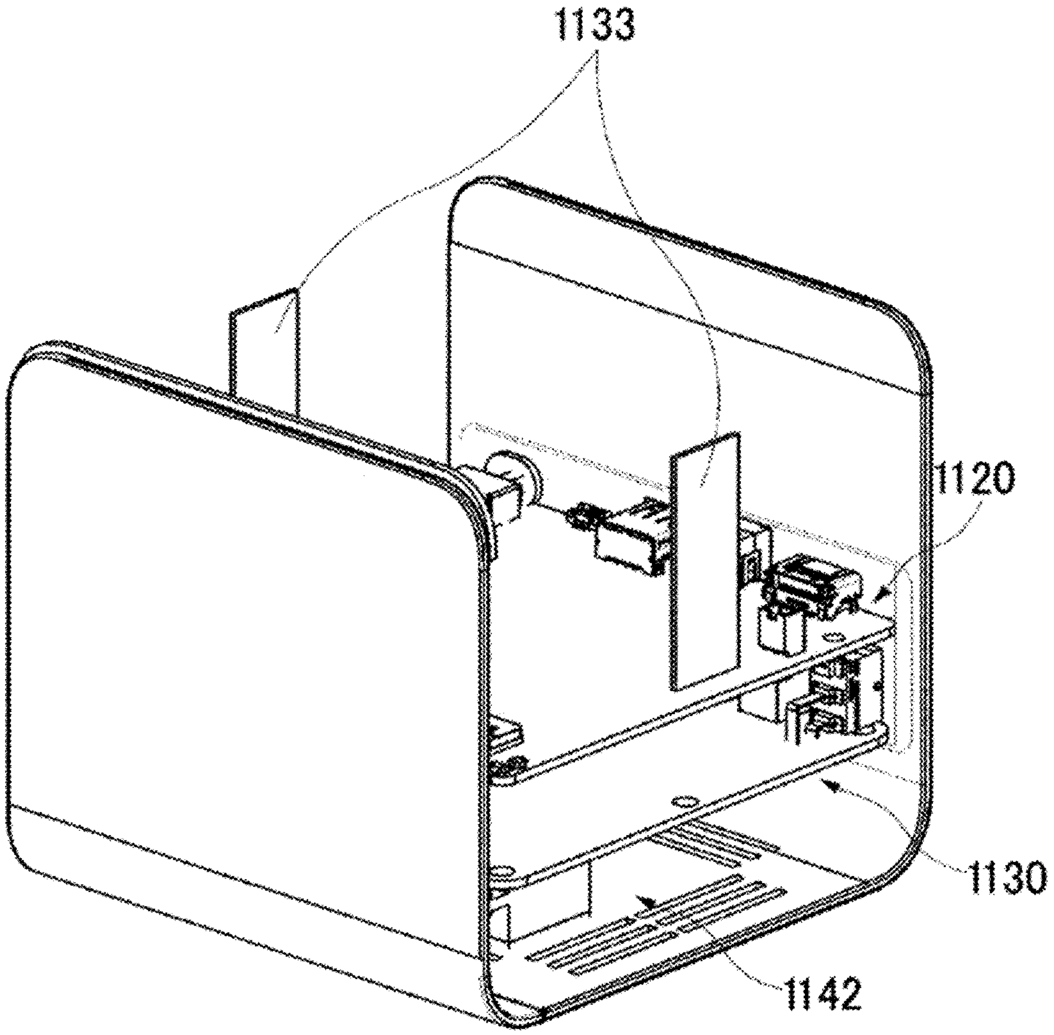
FIG. 32 shows a part of the internal configuration of the integrated terminal device in accordance with another embodiment of the present disclosure.
Figure 33:
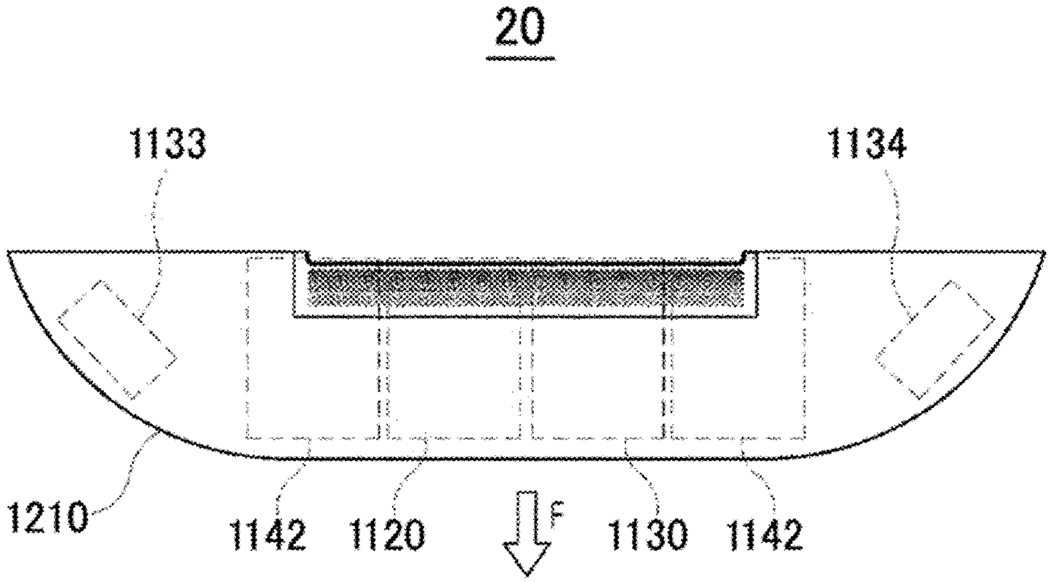
FIG. 33 is a plan view of the integrated terminal device in accordance with yet another embodiment of the present disclosure.

FIG. 28 is a perspective view of the integrated terminal device in accordance with an embodiment of the present disclosure. FIG. 29 shows an internal configuration of the integrated terminal device in accordance with embodiments of the present disclosure. Further, FIG. 30 is a rear view of the integrated terminal device in accordance with an embodiment of the present disclosure, and FIG. 31 is a bottom view of the integrated terminal device in accordance with an embodiment of the present disclosure. FIG. 32 shows a part of the internal configuration of the integrated terminal device in accordance with another embodiment of the present disclosure. FIG. 33 is a plan view of the integrated terminal device in accordance with yet another embodiment of the present disclosure.

Referring to FIG. 28 and FIG. 29, the integrated terminal device 10 according to an embodiment of the present disclosure includes a case 1110, a set-top box (STB) module 1120, an access point (AP) unit 1130, and an Ethernet connection unit 1151.

As shown in FIG. 28, the case 1110 may have, for example, a substantially cuboidal shape. A power switch 1111 and a microphone 1112 may be provided on an upper surface of the case 1110. The power switch 1111 may be configured to turn on or off the integrated terminal device 10 of the present embodiment in a tactile manner.

The microphone 1112 is shown as holes penetrating the surface of the case 1110, which allows the microphone inside to easily collect sound. The front of the case 1110 minimizes or omits light sources like LEDs to minimize unnecessary visual attention for the user. The STB unit 1120 and the AP unit 1130 may be provided inside the case 1110.

Referring to FIG. 29, the STB unit 1120 may include a first central processing unit (CPU) 1121. The STB unit 1120 may be configured to receive video data and provide it to output devices. The video data may be provided from cable/satellite broadcasts, IPTV, or Internet streaming, and the output devices may include display devices, such as TVs and monitors, and audio devices.

The AP unit 1130 may include a second CPU 1131. The AP unit 1130 may be configured to provide a wired or wireless network. The AP unit 1130 may serve as an access point configured to receive an Internet connection and branch it by wire or provide a wireless LAN environments.

In an embodiment of the present disclosure, the STB unit 1120 and the AP unit 1130 are connected to each other through the Ethernet connection unit 1151. The Ethernet connection unit 1151 connects the STB unit 1120 and the AP unit 1130 by wire. Further, the Ethernet connection unit 1151 enables video data to be transmitted and received between the AP unit 1130 and the STB unit 1120.

According to the present disclosure, the AP unit 1130 and the STB unit 1120 are integrated through the Ethernet connection unit 1151, which allows IPTV services to be provided through the home network environment. That is, it is possible to reliably provide video data received by the STB to various IT devices in the home without the need for a separate connection between a network device and a STB or additional devices. Also, an Ethernet connection is structurally stable and minimizes heat generation.

Hereafter, power connection and distribution, heat dissipation structure, mutual arrangement, module, and terminal arrangement of the STB unit 1120 and the AP unit 1130 will be described with reference to FIG. 30 to FIG. 32.

In an embodiment of the present disclosure, either the STB unit 1120 or the AP unit 1130 may include a power connection unit 1122, while the other may include a DC connection unit 1132.

As shown in FIG. 29, the power connection unit 1122 may be provided in the STB unit 1120 so as to be exposed to the outside of the case 1110 to receive power from the outside, and the DC connection unit 1132 may be provided in the AP unit 1130. The DC connection unit 1132 may be provided inside the case 1110 so as to be connected to the power connection unit 1122 to receive power.

That is, the first CPU 1121 of the STB unit 1120 and the second CPU 1131 of the AP unit 1130 may be configured to branch power supplied from the single power connection unit 1122. The power connection unit 1122 may be configured to receive 12 V DC power.

Alternatively, as shown in FIG. 30, the power connection unit 1132 may be provided in the AP unit 1130 so as to be exposed to the outside of the case 1110. Also, the STB unit 1120 may be equipped with the power connection unit 1122 inside the case 1110 and configured to receive power from the power connection unit 1122.

Meanwhile, the case 1110 of the present embodiment may include ventilation holes 1113 at various locations. The ventilation holes 1113 may penetrate the case 1110 to allow communication between the interior and the exterior, and may have a slit shape elongated in a certain direction.

Specifically, as shown in FIG. 28 and FIG. 30, the ventilation holes 1113 may be located at the edges of the cuboidal case 1110. Also, vertically elongated slit-shaped ventilation holes (not shown) may be further formed on the back of the case 1110 in FIG. 3.

Further, as shown in FIG. 31, the ventilation holes 1113 may be located on the bottom of the case 1110. A plurality of ventilation holes 1113 may be formed into a slit shape along with supports 1114. A plurality of supports 1114 may be formed to protrude from the bottom of the case 1110. As shown in FIG. 31, each of the ventilation holes 1113 and the supports 1114 can be arranged at predetermined distances.

When the integrated terminal device 10 of the present embodiment is placed on the floor of the installation space, its bottom is supported by the supports 1114. Thus, it is possible to suppress the blockage of the holes 1113 by the floor.

The ventilation holes 1113 enables heat generated from the internal modules of the case 1110 to be discharged to the outside, and also enables sound output from a speaker 1142 described below to be more effectively transmitted to the outside.

Referring to FIG. 32, the STB unit 1120 may be arranged above the AP unit 1130 with a certain separation from each other inside the case 1110 according to the present embodiment. Accordingly, as can be seen from FIG. 30, ports of the STB unit 1120 may be arranged above those of the AP unit 1130.

If the STB unit 1120 generates more heat than the AP unit 1130, heat generated from the STB unit 1120 flows upwards by natural convection, which suppresses an influence on the AP unit 1130 located under the STB unit 1120. Since the STB unit 1120 and the AP unit 1130 are spaced apart from each other, a thermal impact between the STB unit 1120 and the AP unit 1130 can be minimized.

The ports of the AP unit 1130 which are often continuously connected may be located lower than those of the STB unit 1120. Therefore, the user can easily access the ports of the STB unit 1120 as needed.

Regarding the arrangement of ports, the STB unit 1120 of the present embodiment may include a first port 1123, a second port 1124, and a third port 1125. Herein, the first to third ports 1123 to 1125 are not necessarily of the same type.

Referring to FIG. 30, the first port 1123 may be configured to allow an HDMI or S/PDIF cable to be connected or disconnected for connection to an output device. That is, the first port 1123 may be an HDMI port or an S/PDIF port.

The second port 1124 may be configured to allow a USB Type-C cable to be connected or disconnected. That is, the second port 1124 may be a USB Type-C port according to USB 3.0 or 3.1 protocol.

In the present embodiment, the first port 1123 and the second port 1124 may affect each other, potentially causing performance degradation due to harmonics. Thus, the first port 1123 and the second port 1124 may be spaced apart at a predetermined distance to suppress mutual interference.

More specifically, the third port 1125 is located between the first port 1123 and the second port 1124 and configured to transmit and receive video data in a different manner from the first port 1123 or the second port 1124. Since the third port 1125 necessary for the STB unit 1120 is located between the first port 1123 and the second port 1124, it is possible to maintain consistent spacing between the ports and suppress adverse effects caused by harmonics. The third port 1125 may be, for example, a USB Type-A port.

A microphone on/off button and a reset button may be further provided on the back of the integrated terminal device 10 according to the present embodiment. The reset button can initiate reset for both the STB unit 1120 and the AP unit 1130, which makes the interface simple. Also, an LED (not shown) showing Wi-Fi connection status may be provided on the back.

As shown in FIG. 29 and FIG. 32, the AP unit 1130 may further include a Wi-Fi antenna 1133. The Wi-Fi antenna 1133 is configured to transmit and receive wireless network signals. In the present embodiment, the Wi-Fi antenna 1133 may extend upwards on both sides of the STB unit 1120. Also, the STB unit 1120 may be smaller in size than the AP unit 1130 to maximize signal transmission and reception performance and reduce heat generation from the STB unit 1120.

Meanwhile, the integrated terminal device 10 may be configured according to another embodiment of the present disclosure as shown in FIG. 29 and FIG. 32.

The integrated terminal device 10 of the present embodiment may further include an artificial intelligence (AI) speaker module 1140. According to the present embodiment, the AI speaker unit 1140 provided inside the case 1110 may further include a third CPU 1141 and may be configured to provide voice data corresponding to the user's voice input.

The microphone 1112 may receive the user's voice input. The AI speaker unit 1140 may analyze and process data based on the voice input, either directly or by transmitting it to a server, using an artificial intelligence algorithm (e.g., a language model).

In some embodiments, the third CPU 1141 and the first CPU 1121 may be configured as an integrated processing unit on the same circuit board. Alternatively, the AI speaker unit 1140 equipped with the third CPU 1141 may be connected to the STB unit 1120 through Ethernet.

The AI speaker unit 1140 of the present embodiment may also include a speaker 1142 to output the analyzed and processed voice data. The speaker 1142 may be provided inside the case 1110 and configured to output voice data.

According to the present disclosure, the AP unit 1130, the STB unit 1120, and the AI speaker unit 1140 are integrated, which allows IPTV services to be provided through the home network environment. Also, it is possible to provide customized voice information that meets various needs of the user. Further, it is possible to transmit and receive various types of voice information through the home network environment.

Meanwhile, as shown in FIG. 32, the speaker 1142 may be located lower than the other modules inside the case 1110.

That is, the STB unit 1120 may be arranged above the AP unit 1130 with a certain separation from each other, and the speaker 1142 may be arranged below the AP unit 1130 with a certain separation from each other.

The speaker 1142 can output sound smoothly through the ventilation holes 1113 on the bottom of the case 1110 and can be protected from heat generated from the STB unit 1120.

According to an embodiment of the present disclosure, the user's voice may be input through the microphone on the upper side of the case 1110 while sound can be output through the bottom surface of the case 1110.

Referring to FIG. 33, an integrated terminal device 20 according to another embodiment of the present disclosure may be flatter than that of the above-described embodiments.

In the integrated terminal device 20 of the present embodiment, a pair of speakers 1142 may be arranged on both sides within the case 1210, which ensures a sense of sense of three-dimensionality or spatial depth in the sound output.

The STB unit 1120 and the AP unit 1130 may be located between the pair of speakers 1142. The STB unit 1120 and the AP unit 1130 may be placed on respective substrates disposed parallel to each other, and may be connected to each other through the Ethernet connection unit. Further, the power connection unit 1122 may be provided between the STB unit 1120 and the AP unit 1130 to share power.

Furthermore, in the present embodiment, the AP unit 1130 may be equipped with both the Wi-Fi antenna 1133 and a Bluetooth antenna 1134. The Bluetooth antenna 1134 may be configured to transmit and receive wireless network signals. As shown in FIG. 33, the Wi-Fi antenna 1133 may be located adjacent to one speaker 1142, while the Bluetooth antenna 1134 may be located adjacent to the other speaker 1142.

With this arrangement, even when the Wi-Fi antenna 1133 and the Bluetooth antenna 1134 operate on the same frequency, interference between Wi-Fi and Bluetooth communications can be minimized. Also, the speakers 1142 are placed on both sides of the STB unit 1120 and the network module, and, thus, it is possible to reduce the influence of heat generated from the module.

The control method of the integrated terminal device can be implemented as a computer program stored in a computer-readable storage medium to be executed by a computer or a storage medium including instructions executable by a computer. Also, the control method of the integrated terminal device can be implemented as a computer program stored in a computer-readable storage medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

INDUSTRIAL APPLICABILITY

The present disclosure relates to terminal device integrating and utilizing an access point (AP), a set-top box, and an AI speaker and a control method of the terminal device, and thus has industrial applicability.

The invention claimed is:

1. An integrated terminal device, comprising:

an access point (AP) unit that provides a wireless LAN function; and a set-top box (STB) unit that is connected to the AP unit through Ethernet, wherein the AP unit initiates a home network communication with the STB unit through a Dynamic Host Configuration Protocol (DHCP) and assigns an Internet protocol (IP) address to the STB unit, and the AP unit and the STB unit transmit and receive packets to and from each other through an inter-process communication (IPC).

2. The integrated terminal device of claim 1, wherein the STB unit transmits an Address Resolution Protocol (ARP) request through an IP address of the AP unit.

3. The integrated terminal device of claim 1, wherein the packets transmitted between the AP unit and the STB unit are in the form of JavaScript Object Notation (JSON), and each packet in the form of JSON includes a header including at least one of information on a name of the integrated terminal device, information on a version of a protocol configured in the integrated terminal device, and token information for data encryption during communication between the AP unit and the STB unit.

4. The integrated terminal device of claim 3, wherein the token information is randomly generated, computed along with symmetric keys delivered to both transmission and reception sides of the packet, and used for the data encryption.

5. The integrated terminal device of claim 3, wherein the JSON data further includes a data portion transmitted along with the header data in a packet, and the data portion includes at least one of user equipment information including request parameters to retrieve or control information of a user equipment and AP information including request parameters to retrieve or control information of the AP unit, and the user equipment information is information for controlling the integrated terminal device including the AP unit and the STB unit.

6. The integrated terminal device of claim 5, wherein the user equipment information includes message type information to define a type of message, and the message type information is configured to define at least one of a type of a request of the AP unit to get data from the STB unit, a type of a request of the AP unit to set data from the STB unit, a type of a response of the AP unit to the request of the STB unit, a type of a request of the STB unit to get data from the AP unit, a type of a request of the STB unit to set data from the AP unit, and a type of a response of the STB unit to the request of the AP unit.

7. The integrated terminal device of claim 6, wherein the data portion further includes response code information to classify whether data transmission between the AP unit and the STB unit succeeded or failed, and the integrated terminal device performs retransmission in a situation corresponding to response code information indicative of data transmission failure.

8. The integrated terminal device of claim 1, further comprising:

an AI speaker unit that recognizes voice input from the outside and outputs a processing result through a speaker, wherein the STB unit is connected to the AI speaker unit and controls the AP unit based on a user command input through an AI CPU.

9. An integrated terminal device, comprising:

an access point (AP) unit that provides a wireless LAN function; and a set-top box (STB) unit that is connected to the AP unit through Ethernet, wherein the AP unit initiates a home network communication with the STB unit through a Dynamic Host Configuration Protocol (DHCP) and assigns an Internet protocol (IP) address to the STB unit, and the STB unit transmits activation request information to a management server through the AP unit and receives activation response information from the management server through the AP unit.

10. The integrated terminal device of claim 9, wherein the AP unit performs Network Address Translation (NAT) when the STB unit transmits the activation request information and when the STB unit receives the activation response information.

11. The integrated terminal device of claim 9, wherein when a user performs self-activation of the STB unit, the STB unit transmits self-activation target confirmation request information to the management server through the AP unit to confirm whether the STB unit is a target for self-activation, receives self-activation target confirmation response information transmitted from the management server through the AP unit, and performs an authentication process with the management server through the AP unit, and upon successful authentication, the STB unit transmits the activation request information through the AP unit and receives the activation response information through the AP unit.

12. The integrated terminal device of claim 9, wherein when the management server performs triggering activation, the STB unit receives trigger request information from the management server through the AP unit, transmits trigger response information to the management server through the AP unit, transmits the activation request information to the management server through the AP unit, and receives the activation response information transmitted by the management server through the AP unit.

13. The integrated terminal device of claim 9, further comprising:

an AI speaker unit that recognizes voice input from the outside and outputs a processing result through a speaker, wherein the STB unit is connected to the AI speaker unit and controls the AP unit based on a user command input through an AI CPU.

14. An integrated terminal device, comprising:

an access point (AP) unit that provides a wireless LAN function; and a set-top box (STB) unit that is connected to the AP unit through Ethernet, wherein the AP unit initiates a home network communication with the STB unit through a Dynamic Host Configuration Protocol (DHCP) and assigns an Internet protocol (IP) address to the STB unit, and the STB unit transmits software upgrade request information to the AP unit through an inter-process communication (IPC), receives upgrade request response information from the AP unit and downloads an upgrade file from an upgrade server.

15. The integrated terminal device of claim 14, wherein after the STB unit downloads the upgrade file, the STB unit deletes a previous software version, and when the upgrade server completes the upgrade, the STB unit transmits upgrade completion notification information to the AP unit through the IPC and receives upgrade completion notification response information from the AP unit to complete the upgrade.

16. The integrated terminal device of claim 14, wherein the packets transmitted between the AP unit and the STB unit are in the form of Javascript Object Notation (JSON), and each packet in the form of JSON includes a header including at least one of information on a name of the integrated terminal device, information on a version of a protocol configured in the integrated terminal device, and token information for data encryption during communication between the AP unit and the STB unit.

17. The integrated terminal device of claim 16, wherein the token information is randomly generated, computed along with symmetric keys delivered to both transmission and reception sides of the packet, and used for the data encryption.

18. The integrated terminal device of claim 17, when the JSON data further includes a data portion transmitted along with the header data in a packet, and the data portion includes at least one of user equipment information including request parameters to retrieve or control information of a user equipment and AP information including request parameters to retrieve or control information of the AP unit.

19. The integrated terminal device of claim 18, wherein the user equipment information includes message type information included in the packet and configured to define a type of message, and the message type information is configured to define at least one of a type of a request of the AP unit to get data from the STB unit, a type of a request of the AP unit to set data from the STB unit, a type of a response of the AP unit to the request of the STB unit, a type of a request of the STB unit to get data from the AP unit, a type of a request of the STB unit to set data from the AP unit, and a type of a response of the STB unit to the request of the AP unit.

20. The integrated terminal device of claim 14, further comprising:

an AI speaker unit that recognizes voice input from the outside and outputs a processing result through a speaker, wherein the STB unit is connected to the AI speaker unit and controls the AP unit based on a user command input through an AI CPU.

* * * * *